US010625960B2

(12) United States Patent
Ballantyne

(10) Patent No.: US 10,625,960 B2
(45) Date of Patent: Apr. 21, 2020

(54) CARGO SCRAPING APPARATUS AND SYSTEMS OF UNLOADING AND LOADING CARGO

(71) Applicant: Ross Ballantyne, Paradise Point (AU)

(72) Inventor: Ross Ballantyne, Paradise Point (AU)

(73) Assignee: Pioneer Maritime Pty Ltd (AU)

( * ) Notice: Subject to any disclaimer, the term of this patent is extended or adjusted under 35 U.S.C. 154(b) by 0 days.

(21) Appl. No.: 16/077,277

(22) PCT Filed: Feb. 10, 2017

(86) PCT No.: PCT/AU2017/050112
§ 371 (c)(1),
(2) Date: Aug. 10, 2018

(87) PCT Pub. No.: WO2017/136893
PCT Pub. Date: Aug. 17, 2017

(65) Prior Publication Data
US 2019/0047802 A1    Feb. 14, 2019

(30) Foreign Application Priority Data
Feb. 12, 2016   (AU) .............................. 2016900492

(51) Int. Cl.
B65G 67/60     (2006.01)
B63B 27/00     (2006.01)
(52) U.S. Cl.
CPC ............ *B65G 67/603* (2013.01); *B63B 27/02* (2013.01); *B65G 67/60* (2013.01)
(58) Field of Classification Search
CPC ........ B65G 67/603; B65G 67/60; B63B 27/02
(Continued)

(56) References Cited

U.S. PATENT DOCUMENTS 1,741,167 A  * 12/1929 Smith ..................... B63B 27/22
  37/398
3,002,634 A  * 10/1961 Culp ....................... B63B 27/22
  414/142.9
(Continued)

FOREIGN PATENT DOCUMENTS

CN        203529276 U    4/2014
EP        0013760 A1     8/1980
(Continued)

OTHER PUBLICATIONS

APO, "Reissue of International Preliminary Report on Patentability for related international application PCT/AU2017/050112", dated Feb. 4, 2019. (18 Pages).

(Continued)

Primary Examiner — Lynn E Schwenning
(74) Attorney, Agent, or Firm — Mark Malek; Widerman Malek, PL

(57) ABSTRACT

The present invention is directed to a cargo scraping apparatus for a cargo carrier having a cargo hold. The cargo scraping apparatus includes a gantry, at least one scraper blade adapted to substantially span a width of the cargo hold, means to connect the at least one scraper blade to the gantry, and means to raise or lower the at least one scraper blade relative to the gantry. Moving the gantry relative to the cargo hold causes the at least one scraper blade to push or sweep cargo towards one or more regions of the cargo hold. The invention is also directed to a system for unloading cargo from a cargo hold, a system for assisting in loading cargo into a cargo hold, and a system for loading and unloading cargo into and from a cargo hold.

21 Claims, 13 Drawing Sheets

(58) Field of Classification Search
USPC .......................................... 414/137.1–143.2
See application file for complete search history.

(56) References Cited

U.S. PATENT DOCUMENTS

| | | | | |
|---|---|---|---|---|
| 3,536,208 | A | * | 10/1970 | Skaarup .................. B63B 27/22 |
| | | | | 414/142.4 |
| 4,474,523 | A | * | 10/1984 | Ihle ...................... B65G 67/606 |
| | | | | 414/142.5 |
| 4,737,061 | A | | 4/1988 | Eisold |
| 5,372,468 | A | * | 12/1994 | Ihle ........................ B63B 27/22 |
| | | | | 414/313 |
| 6,048,153 | A | | 4/2000 | Tompkins et al. |

FOREIGN PATENT DOCUMENTS

| | | |
|---|---|---|
| JP | 58-119519 A | 7/1983 |
| WO | WO 2017/136893 A1 | 8/2017 |

OTHER PUBLICATIONS

MacGregor Sweden AB, "Efficient Gravity Self-Unloading Systems for Bulk Carriers", dated Oct. 2015 (4 Pages).
APO, "Written Opinion for related PCT Application Serial No. PCT/AU2017/050112 filed Feb. 10, 2017," dated Mar. 28, 2017. (4 Pages).

\* cited by examiner

CARGO SCRAPING APPARATUS AND SYSTEMS OF UNLOADING AND LOADING CARGO

RELATED APPLICATIONS

This application claims the benefit under 35 U.S.C. 119(e) of Australian patent application serial no. 2016900492 filed on Feb. 12, 2015 and titled Cargo Scraping Apparatus and Systems of Unloading and Loading Cargo, and is related to PCT patent application serial no. PCT/AU2017/050112 filed on Feb. 10, 2017, also titled Cargo Scraping Apparatus and Systems of Unloading and Loading Cargo the entire content of which is incorporated herein by reference except to the extent that disclosure therein is inconsistent with the disclosure herein.

FIELD OF THE INVENTION

This invention broadly relates to a cargo scraping apparatus and systems of unloading or loading bulk cargo. The invention consisting of the apparatus and systems herein disclosed is particularly suitable in relation to offshore transhipping vessels.

BACKGROUND

A critical component in the commercially viable transportation of bulk cargo from one place to another is the efficient unloading and loading of the cargo from and into the vessels, vehicles and other means which are used to transport it (commonly referred to as 'carriers'). Indeed, the cost of transporting bulk cargo often determines whether or not production of the goods is economically justified. The efficient unloading and loading of bulk cargo is a multifaceted problem. Factors to be considered may include, inter alia, the physical properties of the cargo such as its natural flow rate or angle of repose in the cargo hold, transportable moisture limits, the time taken for cargo loading or unloading, warehousing costs, the energy and fuel required to move the cargo and the required amount of operators to make it work, as well as the cost of the export vessel charter fees.

In the context of apparatus and systems for unloading and loading of vessels offshore, additional challenges are faced due to the fluid environment in which the operations take place and solutions which are simpler and easier to maintain may be more suitable. It will be understood by those skilled in the art that the invention is particularly suitable in relation to transhippers (generally comprising purpose built self-propelled, shallow draft vessels) which may be used in the offshore transferring of cargo to an export ship or ocean going vessel ('OGV').

Considerable volumes of bulk cargo may be transported in the cargo hold of a single carrier. For example, a typical OGV is capable of holding between 10,000 and 100,000 metric deadweight tons ('DWT'). A typical transhipping vessel which may be used to load an OGV offshore, is capable of holding between 2,500 and 30,000 (or more) DWT. The size and scale of the carriers and machinery involved in the transportation of cargo presents its own unique problems. For example, the apparatus used in the unloading or loading operations needs to be sufficiently robust to handle the forces of the immense amount of materials being transported.

In the past, examples of cargo unloading and loading systems have relied on gravity combined with an undulating or curved cargo hold base and under-hold conveyers to unload cargo from a carrier. Such systems are inefficient in that the undulating or curved base of the cargo hold may reduce overall cargo carrying capacity and the location of the conveyers under the hold itself can make access to the conveyers and other parts of the system difficult, thereby increasing maintenance time and costs. Another limitation of these types of unloading and loading systems is the natural flow rate of some cargo, for example magnetite or lead-zinc concentrate, which due to a propensity to agglomerate or coagulate may not be suitable for such systems.

There are other prior art examples of apparatus and systems for unloading and loading cargo. One such example is a 'cargo scooper' system which includes at least two conveyers: a first conveyer extends laterally across the breadth of the cargo hold and includes a plurality of scoops for scooping up cargo in the hold; and a second conveyer extends longitudinally along the length of the cargo hold. Both the first and second conveyers are able to be raised and lowered within the hold. The first conveyer is further able to move along the length of the hold so that it can reach the majority of the volume of the hold with its scoops. The first lateral conveyer collects the cargo by its scoops and transfers it to the second longitudinal conveyer, which in turn transfers the cargo to bucket elevators which raise the cargo upwards for relocation outside of the vessel, craft, etc. The conveyers work on the uppermost parts of the cargo first, and are lowered each successive pass of the first conveyer along the length of the hold to progressively remove the cargo until most of it has been removed from the hold.

Another example is a system which incorporates a screw-based mechanism in a boom for transferring cargo from a hold. Screws are located in the arm of a slewing and luffing boom, which is able to be manoeuvred into the reaches of the hold. The screw, by turning, transfers cargo along the length of the boom for relocation outside of the cargo hold.

These systems are not generally used for loading cargo into a hold, as the loading rate is generally too slow to be commercially viable. Instead these screw-based systems are typically used on the shore infrastructure at the ports to unload cargo from OGV holds, however this again is limited to lower throughput speeds.

The cargo scooper and screw-based prior art systems described above have numerous drawbacks, including high maintenance and running costs. More specifically, the cargo scooping system can be costly to maintain due to the propensity for the cargo scoops or the transverse conveyer to break or otherwise malfunction due to the repetitive heavy forces impacting the apparatus as it scoops cargo directly from the hold. Other disadvantages to the cargo scooping system include substantial operational expenditures due to the numerous moving parts. The screw-based system is hampered by the limited reach of the conventional boom, which may be unable to access all regions of deeper or larger holds. If multiple booms are used to achieve better access to the larger and deeper holds, the system becomes considerably more expensive. Such systems may be hindered by low transfer rates as a result of the limited effective size, length and operating speed of the screws.

Prior art systems, such as those for unloading cargo described above, are generally not capable of delivering efficiencies in both loading and unloading operations.

Furthermore, as previously mentioned, the running and maintenance costs of unloading and loading systems for sea transport of cargo are particularly important in the commercial viability of commodity producers and transporters. Simpler systems which are less prone to malfunction are therefore highly sought after.

In view of the shortcomings of the prior art, as well as the need for more efficient cargo loading and unloading apparatus and systems, it would therefore be desirable to have an apparatus and system for unloading cargo which is relatively simple in design and/or has relatively lower initial capital expenditure and/or lower maintenance and operation costs.

It would also be desirable for the apparatus and/or system to offer advantages in both the unloading and loading operations.

An object of the present invention is to provide a cargo scraping apparatus and/or systems which improve over the prior art, or which at least provide a useful alternative.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

According to a first aspect of the invention, there is provided a cargo scraping apparatus for a cargo carrier having a cargo hold. The cargo scraping apparatus includes a gantry, at least one scraper blade, means to connect the at least one scraper blade to the gantry, and means to raise or lower the at least one scraper blade relative to the gantry, wherein moving the gantry relative to the cargo hold causes the at least one scraper blade to scrape cargo from one position in the cargo hold to another position in the cargo hold.

Preferably, the at least one scraper blade is adapted to span a dimension of the cargo hold. It is particularly preferred that the at least one scraper blade spans the width of the cargo hold.

The gantry is preferably able to move along a length of a cargo hold. The gantry may be able to move along the entire length of the cargo hold, or only along a section of it. Preferably, the gantry is locatable above the cargo hold, or in an upper section of the cargo hold. It is further preferred that the gantry is able to move from at or near a first end of the cargo hold to at or near a second end of the cargo hold. It is preferred that during use the at least one scraper blade is able to reach cargo located in all, or substantially all, regions of the cargo hold.

Preferably, the gantry moves in cycles along the rails. In one cycle, the gantry may move from at or near the first end of the cargo hold to at or near the second end of the hold, and then back to the first end. Alternatively, one cycle may comprise the gantry only moving from at or near a first end of the cargo hold to at or near a second of the hold; this is preferable where the at least one scraper blade is adapted to scrape cargo as the gantry moves towards either the first end, or the second end, of the hold.

Preferably, the cargo scraping apparatus is adapted to scrape layers of cargo towards one or more regions of the cargo hold. Preferably, a layer of cargo is scraped during each cycle made by the cargo scraping apparatus. It is further preferred that each scraped layer comprises a section of cargo that spans the width of the cargo hold.

The gantry may move along a length of the cargo hold by means of a rack and pinion, wherein the rack comprises a rail which sits above the cargo hold. One or more pinions associated with the gantry may engage with the rail to permit movement of the gantry along the rail. Preferably, one or more electronic motors are used to rotate the one or more pinions to move the gantry along the rail. In a particularly preferred embodiment, the one or more electric motors are located on the gantry. The gantry may move relative to the cargo hold by means other than rack and pinion, such as by standard rail gauge and friction on the gantry wheels, by magnets, by a pulley system, or by other suitable means known to the skilled addressee.

Preferably, the at least one scraper blade of the apparatus can be lowered to a particular depth in the cargo hold and is able to maintain that depth as the gantry moves along a length of the cargo hold. The depth of the at least one scraper blade may alternatively be adjusted as the gantry moves along a length of the cargo hold.

The scraper blades may be connected directly to the gantry, or they may be connected indirectly to the gantry via, or in conjunction with, one or more other components.

Preferably, the at least one scraper blade is connected to the gantry by means of at least one pivotable rod, wherein each of the at least one pivotable rod is pivotably connected to the gantry, and pivotably connected to the scraper blade or another component connected thereto. It is particularly preferred that the at least one pivotable rod is pivotably connected to the gantry at or near a first end of the rod and pivotably connected to the scraper blade at or near a second end of the rod. The at least one scraper blade may alternatively be connected to the gantry by means such as one or more extendible or telescoping rods or other means of connecting the gantry to the blade(s) so that the latter is sufficiently supported by the gantry to be able to scrape cargo as the gantry is moved relative to the cargo hold.

The means for raising or lowering the at least one scraper blade may include one or more hydraulic or pneumatic ram(s). Other means may be used for raising and lowering the at least one scraper blade such as one or more winch(es) and one or more wire cable(s), electrically controlled chain hoist(s), worm drives, rack and pinion systems, rope chain and chainwheel, or any combination of the aforementioned raising or lowering means etc. The raising or lowering means is preferably able to be locked such that during any one cycle of the scraping apparatus the at least one scraper blade is held at a certain depth, or within a certain range of depths, in the cargo hold.

In a preferred form of the invention, the means for raising and lowering the at least one scraper blade includes one or more hydraulic driven rams. The ram(s) may be pivotably connected to the gantry and/or pivotably connected to the means for connecting the gantry and the at least one scraper blade. The hydraulic ram(s) may alternatively be pivotably connected to the at least one scraper blade spacer(s) located between two or more scraper blades. The hydraulic ram(s) preferably contain a food grade hydraulic (eg. NSF H1 or ISO 21469 compliant lubricants) which is suitable where the cargo comprises grain or agricultural products such as dry edibles; the hydraulic ram(s) may alternatively use any other fit for purpose hydraulic oil known to the skilled addressee.

Where hydraulic driven ram(s) are used for the raising or lowering means, the ram stroke length is preferably designed to ensure the at least one scraper blade can be raised and lowered to the required positions to reach substantially all regions of the cargo hold. Where two or more hydraulic rams are utilised, they are preferably balanced so they exert equal forces and minimise any twisting or warping of the at least one scraper blade, the gantry and/or a spacer (where two or more blades are separated by such a spacer). It is further preferred that the hydraulic ram(s), when connected to the means for connecting the at least one scraper blade to the gantry, are connected approximately around a middle region of the connection means. This arrangement enables the hydraulic ram stroke to be shorter than the case where the ram(s) are connected approximately toward a lower region of the connection means, or to the scraper blade(s) or spacer(s), though such arrangements may nevertheless be adopted.

During use, the at least one scraper blade is preferably resistant to being dragged deep into the cargo and becoming stuck, and also resistant to pivoting upwards and riding over the cargo. The locking of the raising or lowering means preferably prevents the scraper blade being dragged below a certain depth in the cargo hold during use. Where one or more winches and wire cables are used, the one or more winches are preferably located on the gantry, and the wire cable(s) extend from each winch to one of the at least one scraper blades. A wire cable to be used for the raising or lowering means (or the tension means) may be wound up or wound out (ie. released) by a winch, preferably by means of electrical control including one or more electric motor(s). Preferably, the one or more wire cables are able to be used with pulleys to raise and lower the scraper blade or to provide the tension means. Preferably, each of the at least one scraper blade(s) has two wire cables fixed to it, where each wire cable is fixed either directly to the blade itself or indirectly via one or more parts. The wire cable may be fixed to the blade by means of a wire rope sling at one end of the wire cable (the sling having a suitably high breaking force) which connects via a D shackle to an eyebolt inserted in the blade. Other means of fixing the wire cable to the blade known to the person skilled in the art may also be used.

Alternatively, the wire cable may be fixed to the blade by means of a chain that can be welded directly to the scraper or connected to the scraper by a shackle. It is preferred that wire cables are arranged to be fixed at or near to the opposing longitudinal ends of each blade. Where there is just one blade, it is preferred that a first wire cable is fixed to a first end of said blade, and a second wire cable is fixed to a second end of said blade. Where there are two blades, a first wire cable is preferably fixed at or near to a first end of the first blade; a second wire cable is fixed at or near to a second end of first blade; a third wire cable is preferably fixed at or near to a first end of the second blade; and a fourth wire cable is fixed at or near to a second end of the second blade; and so on for apparatus with more than two blades.

A tension means may be incorporated into the apparatus to make the at least one scraper blade resistant to pivoting upwards and riding over the cargo during use; preferably, the tension means applies a tension force to the at least one scraper blade in a forward direction (ie. the direction of travel of the gantry during scraping); the tension means may include one or more winch(es) and one or more wire cable(s), or hydraulic or pneumatic rams; other means to provide the tension force may also be used.

Components may be added to strengthen the configuration of the apparatus. For example, supporting bars or wires may extend between parts of the gantry, or between the scraper blades and the spacer(s), or other reinforcing structures may be used. It is particularly preferred that the connecting means (e.g. the pivotable rods) be buttressed by supporting structures, for example at locations where the means of raising or lowering a scraper blade is attached to the connection means. Such components or reinforcing structures preferably assist with minimising the twisting or warping of the at least one scraper blade, the gantry, the connection means, the raising or lowering means, and/or the spacer(s) (where two or more blades are separated by spacer(s)).

Diagonal wire cables may be used on the apparatus. The diagonal wires may extend between two or more connecting means (or between two or more scraper blades) to assist in maintaining a parallel arrangement of the connecting means (or a parallel arrangement of the blades). These diagonal wire cables preferably improve the structural integrity of the apparatus.

The apparatus may include more than one type of means to connect the scraper blade to the gantry (or more than one type of raising or lowering means). Depending on the interrelationship between the means to connect the scraper blade to the gantry and the raising or lowering means, and the shared forces between these components, the raising or lowering means connected to one or more of the blades may function to improve the scraping of cargo. For example, where a plurality of scraper blades are linked by one or more spacer(s) and each of the scraper blades is pivotably connected to rods which themselves are also pivotably connected the gantry, the raising or lowering means associated with just one scraper blade can raise or lower the plurality of scraper blades. So while one raising or lowering means may be connected to just one of the blades to perform the raising or lowering of the blades, other raising or lowering means connected to the scraper blade(s) may operate predominantly as tension means to apply to those other blade(s) a force in a forward direction and to improve the ability of the cargo scraping apparatus to scrape cargo by reducing the tendency for the blades to rise upwards and away from the cargo.

Where there are two or more scraper blades, it is further preferred that during the initial setup the first (forwardmost) blade is fixed so that during use it is closer to the gantry than a second blade (behind forwardmost blade); and if a third blade (behind the second blade) is present, the second blade is fixed closer to the gantry than the third blade, and so on where each blade down the line is further away from the gantry (or closer to the base of the hold) than the previous blade during any one cycle of the apparatus.

Where there are two or more scraper blades, it may be that the relative distance of each blade to the gantry during use does not change. That is, if one blade is closer to the gantry than another blade at the time of commissioning, it remains that same distance closer to the gantry during use, within some small tolerance amount, during the entire lifespan of the apparatus; alternatively the relative distance of each blade to the gantry may be changed during each initial setup of the apparatus to suit the requirements of a particular unloading or loading operation. Means of changing the blade distance relative to the gantry may include a plurality of connection points located on the scraper blades (or on other components associated with the blades) and each connection point is able to connect the scraper blades to the gantry, whereby the plurality of connection points are spaced such that a connection point located towards an upper part of the scraper enables the blade to be positioned a shorter distance from the gantry compared to a connection point located towards a lower part of the scraper. The connection points may comprise a plurality of bolts which, for example, are each able to pivotably connect to a rod which connects to the gantry. Other means known to the person skilled in the art to change the scraper blade distance relative to the gantry may alternatively be used.

The at least one scraper blade may have a flat surface. Alternatively, the at least one scraper blade may have an angled surface, similar to a snow plough, which enables the cargo to more readily be pushed towards one or more sides of the cargo hold. The scraper blade may be symmetrical, or substantially symmetrical, about a vertical axis so that it can scrape, push or sweep cargo when moving towards two opposing ends of the cargo hold.

The cutting angle of the scraper blade (ie. the angle between the cutting edge of the scraper blade and cargo lying flat in the hold) may be adjustable. It is preferred that adjusts to the cutting angle occur between, and not during, any particular unloading operation. The cutting angle may be adjusted by means of removable pins which may secure a cutting blade that is otherwise pivotable with respect to the scraper. The pins are preferably adapted to fit into apertures in the scraper, and when secured, maintain the cutting angle of the blade during use. Other means known to the person skilled in the art to permit an adjustable cutting angle may alternatively be used.

In at least one preferred embodiment, the cargo scraping apparatus includes two scraper blades, wherein in use the blades may be positioned so that a first (forwardmost) scraper blade spans the width of the cargo hold and during use is located closer to the gantry than a second scraper blade (which also spans the width of the cargo hold), thereby creating a gradient between the two scraper blades. It is preferred that the gradient between the two scraper blades remains constant, or substantially constant, during operation of the cargo scraping apparatus.

It is preferred that the gradient between the first and second (or between other) scraper blades facilitates the scraping of cargo. It is particularly preferred that the gradient between two blades can be chosen to facilitate the scraping of cargo according to the preferred unloading operation sequence which may include considerations such as the cargo's natural angle of repose in the cargo hold, other physical or natural properties of the cargo, or the dimensions of the cargo hold.

The rails of the invention that the gantry moves along are preferably parallel to the base of the hold. It is preferred that the angle at which the cutting edge of the scraper blade hits cargo lying perfectly flat in the cargo hold is between approximately 5 degrees and 90 degrees, though other cutting angles may be employed. Where the cutting angle is nearer to 90 degrees, the cutting edge of the blade is nearer to being perpendicular with cargo lying flat in the cargo hold and the scraper blade cuts deeper into the cargo during use, whereas when the cutting angle is nearer to 5 degrees, the cutting edge of the blade cuts less deeply into the cargo when the blade is pulled during use.

The means of raising or lowering the at least one scraper blade relative to the gantry preferably permits the blade to be positioned substantially in line with the gantry (eg. within the overall structure of the gantry, or close thereto) when it is in its most raised position, and to be positioned substantially at the bottom of the cargo hold when the blade is in its lowest position.

Where the gantry is connected to the at least one scraper blade by at least one pivotable rod, the rod(s) are preferably able to pivotably move from a substantially horizontal position in which the at least one rod is approximately in line with the gantry when the at least one scraper blade is in its most raised position. The rod(s) are also preferably able to pivotably move to a substantially vertical position in which the at least one rod is approximately at right angles to the length of the gantry when the at least one scraper blade is in its lowest position. Where the gantry is connected to the at least one scraper blade by at least one telescoping rod, the rod(s) are able to telescopically move from a collapsed position in which the at least one telescoping one rod is collapsed so as to be substantially within the gantry when the at least one scraper blade is in its most raised position. The at least one telescoping rod is also preferably ably to move to an extended position in which the at least one telescoping rod spans approximately the depth of the cargo hold when the at least one scraper blade is in its lowest position in the cargo hold. A combination of different means for connecting the at least one scraper blade to the gantry may be used.

Preferably, the cargo scraping apparatus is adapted to scrape the cargo within the cargo hold towards one or more regions of the cargo hold as the gantry moves towards the one or more regions of the cargo hold. It is preferred that the scraping apparatus is adapted to scrape the cargo towards an end region of the cargo hold as the gantry moves towards said end region.

In at least one preferred embodiment, the at least one scraper blade is adapted to be able to scrape cargo towards two opposing ends of the cargo hold such that cargo is able to be scraped towards a first end of the cargo hold as the gantry moves towards the first end of the cargo hold; and cargo is able to be scraped towards a second opposing end of the cargo hold as the gantry moves towards the second opposing end of the cargo hold.

Where the scraping apparatus includes two or more scraper blades, at least two of the blades are preferably linked via one or more spacer(s). Preferably the one or more spacer(s) comprise spacer beam(s), the one or more spacer beam(s) being adapted to keep the at least two blades physically separate from another. The means of connecting the at least two scraper blades to the gantry may be directly connected to the one or more spacer beams, or alternatively connected to each of the two or more scraper blades.

Preferably, the means to connect the at least one scraper blade to the gantry includes rods, the rods being pivotable with respect to the gantry, and pivotable with respect to the scraper blade(s) or the one or more spacer(s).

In a particularly preferred form of the invention, the scraping apparatus has two scraper blades, linked by one or more spacer(s), the scraper blades being connectable to the gantry by rods which are pivotable with respect to the gantry, and pivotable with respect to the scraper blades. It is further preferred that the privotable rods, the gantry, the one or more spacer(s) and the scraper blades co-operably move together in the form of a parallelogram, whereby the gantry remains substantially parallel with the one or more spacer(s) as the two or more blades are raised or lowered with respect to the gantry. It is more accurate to use the term substantially parallel as it may be that, for operational benefits, the distance between the gantry and a first blade is less than the distance between the gantry and a second blade.

In certain preferred forms of the invention having two or more scraper blades, hydraulic driven ram(s), or other raising or lowering means, while connected (directly or indirectly) to only one blade, may operate to perform the raising or lowering of more than one blade. This advantage is obtained by choosing an arrangement of structures in the apparatus that move co-operably, including the means to connect the scraper blade to the gantry and the raising or lowering means (for example, the parallelogram arrangement referred to above).

Alternatively, in other forms of the invention three or more scraper blades may be included, some of which may be linked by spacer(s) and able to co-operably move together broadly in the form of a parallelogram, and some of which may not be so linked.

The cargo scraping apparatus is primarily directed for use in unloading operations, however the apparatus may additionally be used in cargo loading operations. During loading operations, the apparatus may operate on cargo which has been conventionally poured into the cargo hold through at least one cargo loading port so that the cargo forms in at least one pile that tapers towards the upper part of the cargo hold. Preferably, the scraping apparatus is adapted to scrape the upper section of the at least one tapered pile of cargo and thereby more evenly spread the cargo around the cargo hold.

In accordance with a second aspect of the invention there is disclosed a system for unloading cargo from a cargo hold. The system includes the cargo scraping apparatus as described above and cargo conveying means which is able to convey cargo away from the cargo hold, wherein the cargo scraping apparatus is adapted to scrape cargo towards the cargo conveying means and thereby facilitate the unloading of the cargo from the cargo hold.

The system for unloading cargo from a cargo hold may include at least one cargo collecting means located in the base of the cargo hold, whereby the cargo in the cargo hold is scraped by the scraping apparatus towards the cargo collecting means which then transfers the collected cargo towards the cargo conveying means.

It is further preferred that the cargo collecting means extends along the breadth of the base of the cargo hold and is located towards an end of the hold. The cargo collecting means is adapted to transfer the cargo collected by it to a cargo conveying means. The cargo conveying means is adapted to convey the cargo received by it away from the cargo hold.

Preferably, the cargo collected by the cargo collecting means is directed to one or more cargo distributing and regulating means within, or associated with, the collecting means for distributing and regulating the transfer of the cargo from the collecting means to the conveying means.

Preferably, the cargo collecting means includes a hopper which extends across the base of an end of the cargo hold; the cargo distributing and regulating means includes one or more gates; and the cargo conveying means includes one or more bucket elevators, a cross conveyer and a discharge boom; wherein in use cargo is scraped by the scraping apparatus towards the hopper, then distributed by the one or more of gates to the one or more bucket elevators which carry the cargo towards the cross conveyer which feeds the discharge boom to thereby convey the cargo away from the cargo hold.

Preferably, the cargo collecting means is located at least at one end of the cargo hold, said end being the same end of the cargo hold towards which the cargo scraping apparatus is able to scrape the cargo.

Preferably, the cargo hold incorporates sloping side walls which aid the flow of cargo towards the cargo collecting means.

In a preferred form of the invention, the cargo conveying means includes one or more bucket elevators adapted to raise cargo vertically, the one or more bucket elevators extending upwards and being adapted to transfer cargo to a cross conveyer for conveying the cargo laterally via a cross conveyer belt. It will be understood by the person skilled in the art that in use cargo is adapted to be thrown from each bucket of the one or more bucket elevators at or near the top of each elevator. Preferably, the cross conveyer includes a belt which is wide enough to permit the cross conveyer belt to catch the cargo being thrown from each bucket; it is further preferred that the cross conveyer belt includes skirts along the edges of the belt and runs at a slow enough speed to further permit the cross conveyer to catch the cargo thrown by the bucket elevator and settle the cargo before feeding it into a slewing and luffing discharge boom.

Preferably, the amount of cargo permitted to flow through the gates and the speed of the bucket elevators and cross conveyers are able to be electronically controlled by the operator of the system. Preferably, the gates can be variably opened to control the amount of cargo which flows through them.

In at least one preferred form of the invention, the cargo distributing and regulating means includes a plurality of gates and each gate is adapted to distribute cargo to one of a plurality of bucket elevators, each bucket elevator being adapted to transfer cargo to the same cross conveyer. Preferably, the gates are adapted to handle specific cargo types and are each controllable to permit a flow of that cargo which is able to be received by the plurality of bucket elevators without the elevators being swamped or stalling. It is further preferred that the belt speed of the bucket elevators and cross conveyer are able to be electrically controlled by an operator of the system.

It is preferred that the cross conveyer is adapted to feed a slewing and luffing discharge boom. Preferably, this boom includes a belt having a speed which is electrically controllable, and the belt is adapted to run at a fast enough speed to efficiently discharge the material fed to it by the cross conveyer. As a result of this efficient management of discharging the cargo, the overall weight of the boom, belt and cargo can be minimised. Preferably, the discharge boom is of the required dimensions (ie. height and length) to be able to discharge cargo to the desired location(s) away from the cargo hold.

Other cargo collecting means known to the person skilled in the art may be used in place of, or in addition to, a hopper; and cargo conveying means other than the combination of a bucket elevator, a cross conveyer and a discharge boom may be used. For example, just a bucket elevator may be used to convey the cargo away from the cargo hold; alternatively, conveying means such as loop cleated conveyer belts, spirals, bucket grabs, or any combination of the aforementioned conveying means may be used.

In a third aspect of the invention, there is disclosed a system for assisting in the loading of cargo into a cargo hold. The system includes the cargo scraping apparatus described above and is able to scrape peaks of cargo piles in the hold, thereby spreading the cargo more evenly so it lies flatter in the cargo hold. Preferably, the scraping apparatus is adapted to cyclically scrape the upper sections of cargo piles formed during a loading operation, so that the cargo is more evenly spread in the cargo hold during the entire loading operation.

During loading operations, the cargo scraping apparatus can work through pouring cargo streams as the machinery is able to be protected with coverings.

In a fourth aspect of the invention, there is disclosed a system for assisting in the loading and unloading cargo into and from a cargo hold, wherein in the system includes the features as described above with respect to the second and third aspects of the invention.

Preferably, all electric motors used on the scraping apparatus or otherwise in the systems of the invention are static proof and earthed. If on a sea vessel, the motors are earthed in accordance with one of the usual methods known to persons skilled in the art of shipbuilding.

Preferably, a cargo cover is adapted to cover and protect the whole cargo hold from the environmental elements. It is preferred that the cargo cover includes sealable ports for loading cargo into the hold.

Preferably, during any one scraping cycle of the scraping apparatus, the more the gantry moves relative to the cargo hold, the more cargo is scraped by the at least one scraper blade. Preferably, during any one scraping cycle of the at least one scraper blade in the cargo hold, each of the at least one scraper blades incrementally collects cargo as it scrapes cargo from a first end of the cargo hold to a second end of the hold.

The apparatus or systems described herein are preferably adapted for unloading or loading a variety of bulk materials such as grain, fertiliser, bulk minerals or agricultural products. The apparatus or systems of the invention may also be adapted to be used in the unloading or unloading of iron ore, coals and cokes, or other bulk materials. Where materials are more prone to agglomerate, the cargo collecting means or cargo regulating and distribution means may be modified to better hand such materials or omitted altogether so that the cargo conveying means can directly receive the cargo that is scraped by the scraping apparatus.

BRIEF DESCRIPTION OF THE DRAWINGS

Possible and preferred features of the present invention will now be described with particular reference to the accompanying drawings. However, it is to be understood that the features illustrated in and described with reference to the drawings are not to be construed as limiting on the scope of the invention.

DETAILED DESCRIPTION OF THE INVENTION

Figure 1:
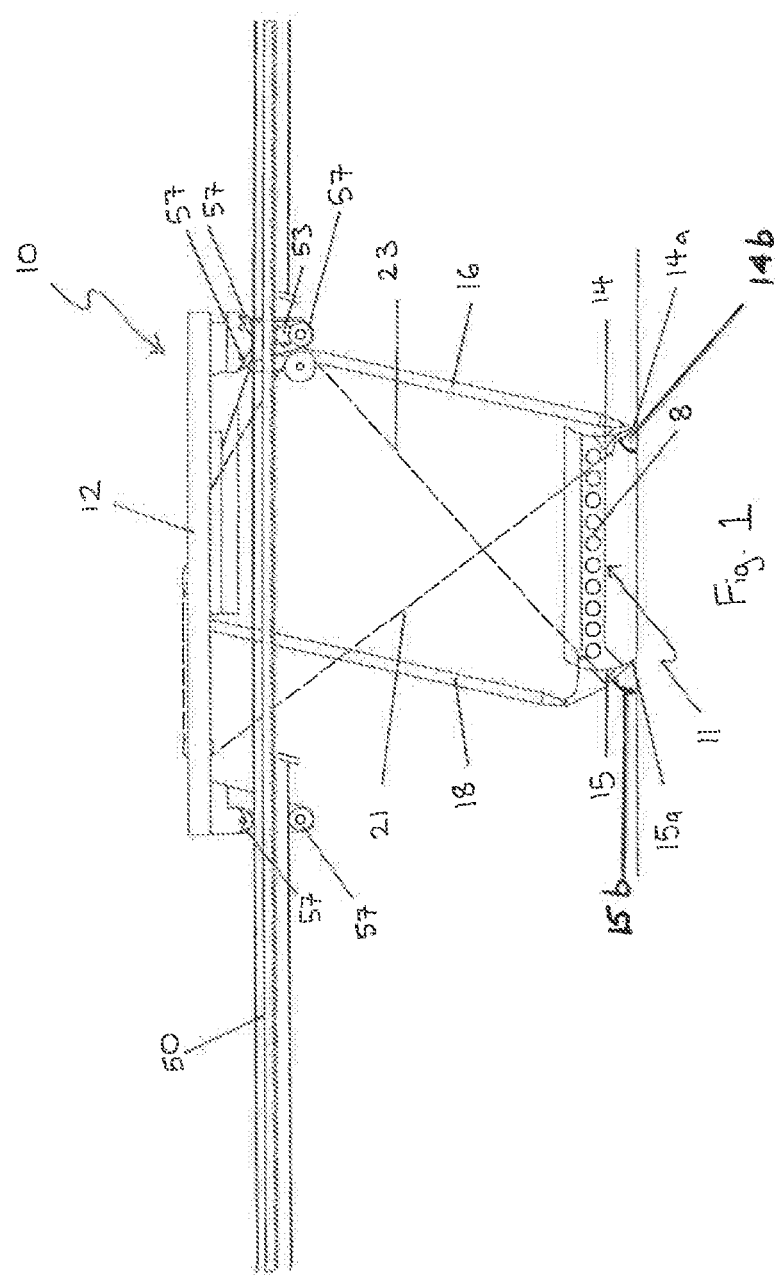
FIG. 1 is a side view of a first preferred embodiment of the cargo scraping apparatus located on two rails, where the blades of the scraping apparatus are lowered.
Figure 2:
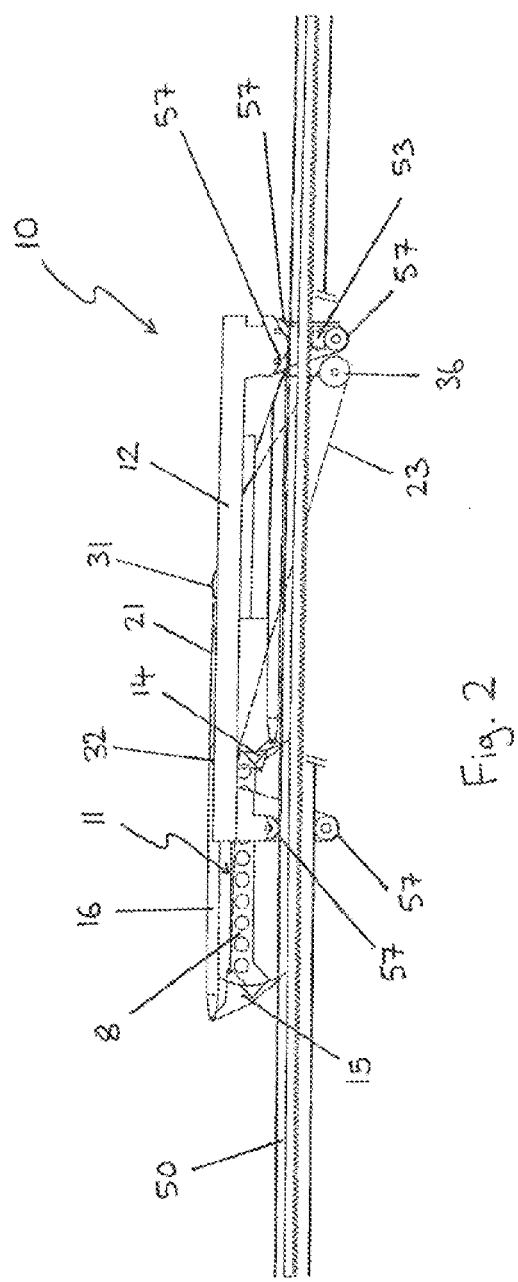
FIG. 2 is a side view of the cargo scraping apparatus and rails depicted in FIG. 1, where the blades of the scraping apparatus are raised.
Figure 3:
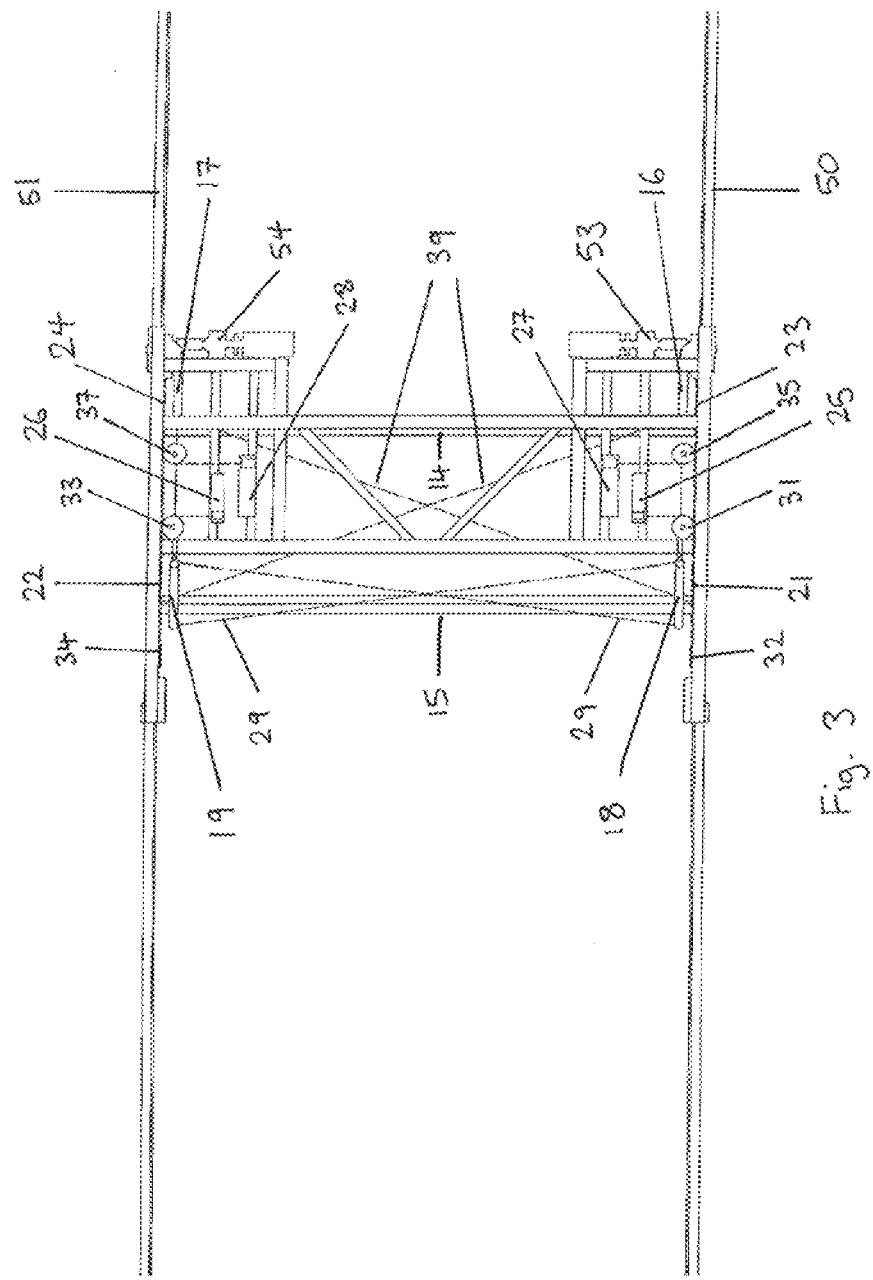
FIG. 3 is a top down view of the cargo scraping apparatus depicted in FIGS. 1 and 2.

With reference to FIGS. 1 to 3, a first embodiment of the invention comprising a cargo scraping apparatus 10 is depicted from the side. The cargo scraping apparatus 10 is located on two rails 50, 51 (only one of which 50 is depicted in FIGS. 1 and 2). The scraping apparatus 10 includes a gantry 12; two blades 14, 15; two spacer beams 8, 9 (only one of which 14 is depicted in FIGS. 1 and 2) linking the two blades 14, 15 together; four pivotable rods 16-19 (only two of which 16, 18 are depicted from the side view of FIGS. 1 and 2); wherein cargo is able to be scraped by the scraper blades 14, 15 from one position in a cargo hold to another by moving the gantry 12 along the rails 50, 51 (the cargo and cargo hold are not depicted in FIGS. 1 to 3). The blades 14, 15 and the spacer beams 8, 9 together are herein referred to as the "scraper" 11.

With reference to FIG. 3 in particular, the scraping apparatus 10 shown includes four pivotable rods, 16 to 19 connecting the blades 14, 15 to the gantry 12:

The first rod 16 and the second rod 17 are each pivotably attached to a front region of the gantry 12; the first and second rods 16, 17 are also each pivotably attached to a front end of the scraper 11;

The third rod 18 and the fourth rod 19 are each pivotably attached to a central region of the gantry 12; the third and fourth rods 18, 19 are also each pivotably attached to a rear end of the scraper 11.

The spacer beams 8, 9 in FIGS. 1 and 2 (only one of which, 8, is shown) are substantially parallel to the rails 50, 51, the front blade 14 being slightly closer to the gantry 12 than the rear blade 15. There is therefore a slight gradient between the two scraper blades 14, 15.

The two blades 14, 15 of the embodiment depicted in FIGS. 1 to 3 have a cutting angle of 45 degrees so they are each angled approximately 45 degrees to the rails 50, 51. In other words, the cutting edges 14a, 15a of each of the scraper blades hit cargo lying perfectly flat in the cargo hold 40 at an angle of approximately 45 degrees as illustrated, for example, in FIG. 1 and labeled as 14b, 15b. The surface of each of the blades 14, 15 is flat, however it will be appreciated that the surface of one, or both of the blades may include two angled surfaces 14b, 15b which meet at a central part of each blade to assist in pushing cargo to sides of the cargo hold.

With further reference to FIGS. 1 to 3, the gantry 12 of the scraping apparatus 10 moves with respect to the rails 50, 51 by method of rack and pinion. Each of the rails 50, 51 has a series of teeth which are engageable with complementary shaped teeth located on two toothed wheels 53, 54 of the gantry 12 (only one of which, 53, is depicted in FIGS. 1 and 2). The two toothed wheels 53, 54 are powered by electric motors 55, 56 which are located beside the two toothed wheels. With reference to FIG. 2 in particular, the apparatus 10 further includes ten non-powered stabilising wheels 57. The motors 55, 56 to turn the toothed wheels 53, 54 of the scraping apparatus 10 are sufficiently powerful so as to be able to rotate the wheels 53, 54 to move the scraping apparatus 10 along the rails 50, 51 and to thereby push cargo collected by the blades 14, 15. The cargo scraping apparatus 10, including two scraper blades 14, 15, pivotable rods 16-19, spacer beams 8, 9 etc, weighs approximately 20 tonnes, and the cargo collected by each blade as it travels the length of the cargo hold is approximately 10 tonnes.

With reference to FIG. 3 in particular, electric motors 54, 55 which turn the toothed wheels of the gantry 12 are visible and four wire cables 21-24 each operable by an electrically controlled winch 25-28, wherein:

A first wire cable 21 extends from a first electric winch 25, via a first and second pulley 31, 32 and attaches to a first end of the first blade 14;

A second wire cable 22 extends from a second electric winch 26, via a third and fourth pulley 33, 34 and attaches to a second end of the first blade 14;

A third wire cable 23 extends from a third electric winch 27, via a fifth and sixth pulley 35, 36 (only one of which, 35, is visible in FIG. 3), and attaches to a first end of the second blade 15; and A fourth wire cable 24 extends from a fourth electric winch 28, via a seventh and eighth pulley 37, 38 (only one of which, 37, is visible in FIG. 3) and attaches to a second end of the second blade 15.

It will be appreciated that, in the side views of the scraping apparatus 10 and rails 50, 51 of FIGS. 1 and 2, each and every component described above is not depicted. This is due to the symmetrical structure of the apparatus 10 of the illustrated embodiment of the invention. For example, in FIGS. 1 and 2, only one of the two spacer beams 8 is shown, only one of the two rails, 50, is shown, only two of the four pivotable rods 16, 18 are shown, only three of the eight pulleys (namely the first pulley 31, the second pulley 32 and the sixth pulley 36) described above are shown.

Further description is provided in order to better explain the how the cables 21-24 which raise and lower the scraper 11 operate during use: the cables 21, 22 which are connected to the first blade 14 may be understood as 'lifting cables' which are connected to a locking system within the winches 25, 26. When locked, these wire cables 21, 22 impede the scraper blades 14, 15 digging into the cargo during scraping. The wire cables 23, 24 which are connected to the second blade 15 may be understood as 'tension cables' which may be locked by their respective winches 27, 28 to impede the upwards pivoting of the scraper blades 14, 15 away from the cargo during scraping.

Each of the wire cables 21-24 is attached to the blade by means of a wire rope sling at one end of each wire cable which connects via a D shackle to an eyebolt (not shown) in one of the blades 14, 15. The slings and wire cables are safe working load ('SWL') rated to carry the weight of the blades, rods, spacer beams, etc. Effectively, the weight borne by each of the two lifting wire cables, 21 and 22, is approximately 10 tonnes each. The width of the wire cables 21-24 is 1.5 inches (having a SWL of 18 tonnes).

Figure 7:
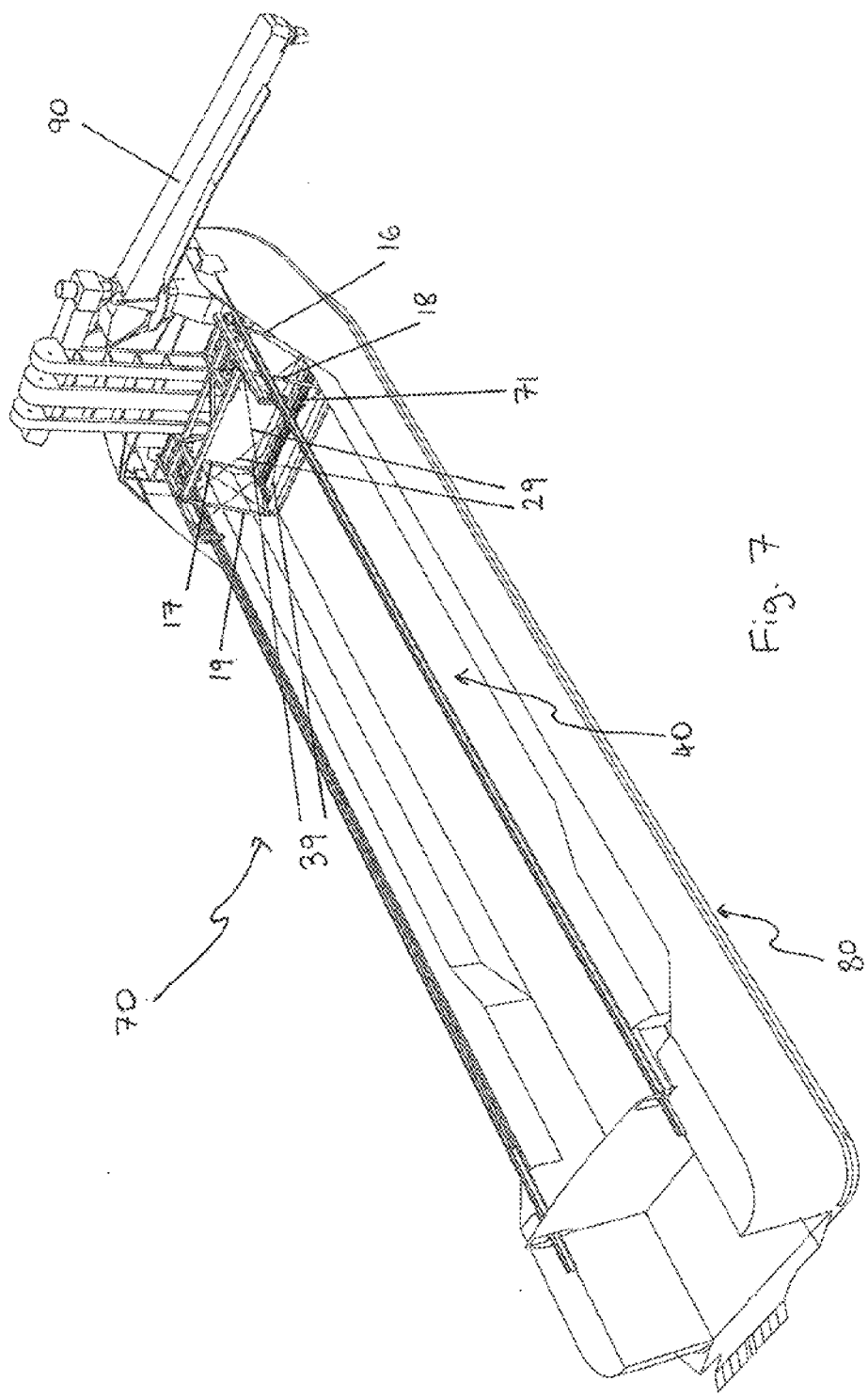
FIG. 7 is a right perspective view of the cargo unloading and loading system depicted in FIGS. 5 and 6 near the end of the unloading operation.
Figure 8:
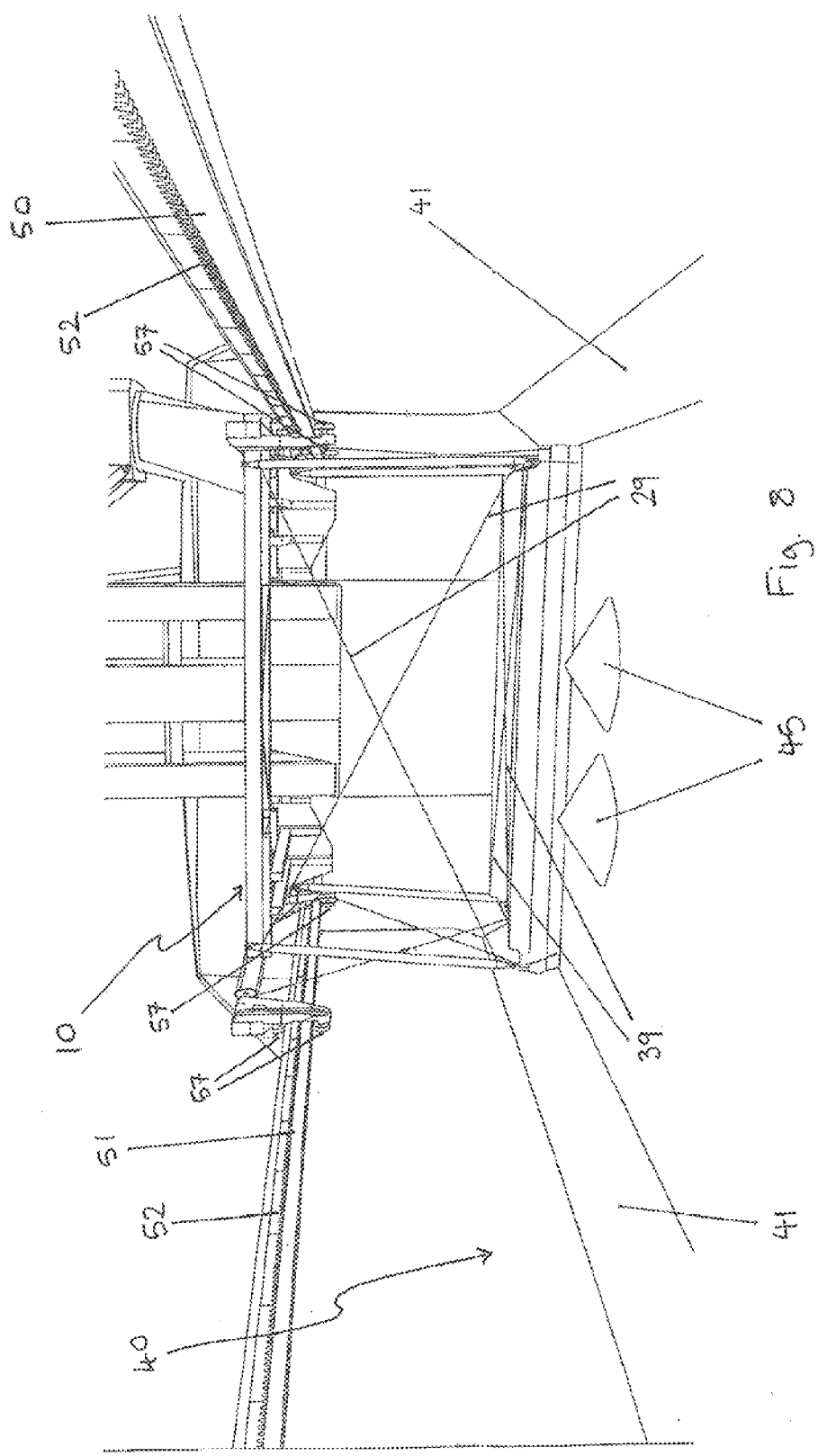
FIG. 8 is an interior perspective view of a cargo hold and the cargo scraper apparatus of FIGS. 1 to 4.

With reference to FIGS. 3, 7 and 8 in particular, diagonal wire cables 29 are depicted between the rear pivotable rods 18, 19 assist in maintaining a parallel arrangement of these rods and generally improve the structural integrity of the apparatus 10; although not depicted in the figures, diagonal wire cables may also be used between the front pivotable rods 16, 17. Diagonal wire cables 39 are also shown between the scraper blades 14, 15 to assist in maintaining the broadly parallel arrangement of the scraper blades 14, 15 and generally improve the structural integrity of the apparatus 10 during use. The diagonal wire cables 29, 39 are affixed to the pivotable rods 16-19 and to the scraper blades 14, 15 by the same, or similar, means as described above to affix the wire cables 21-24 to the blades 14,15.

Figure 4:
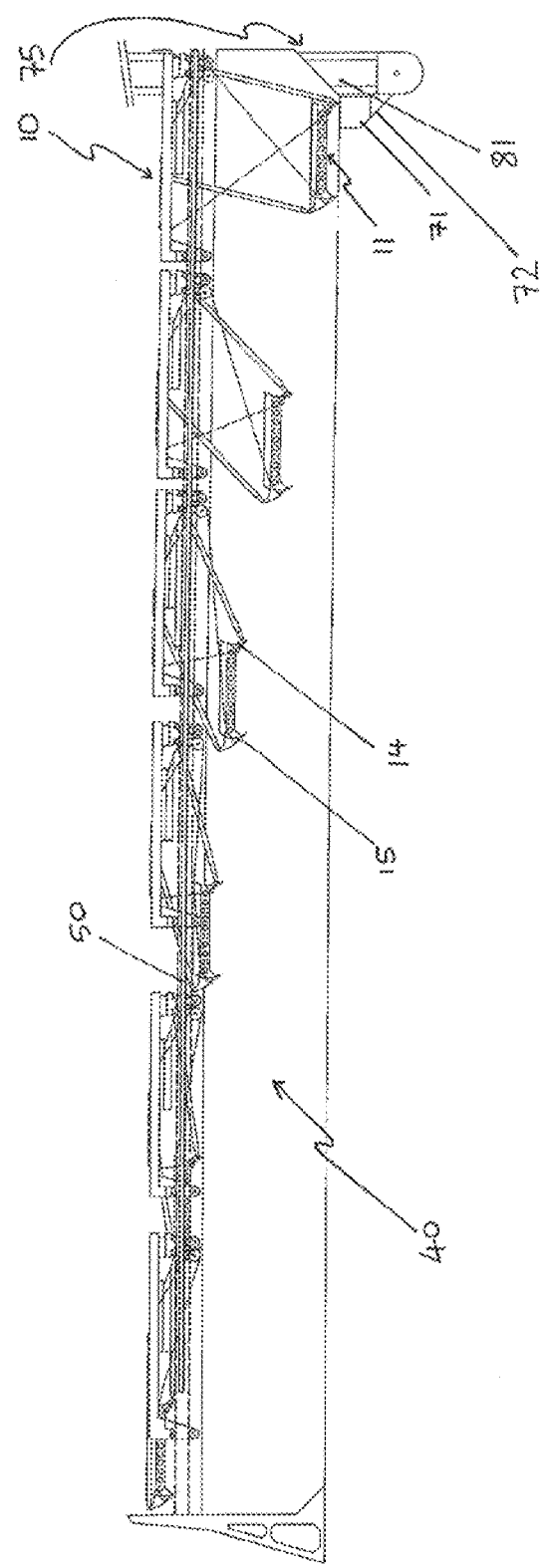
FIG. 4 is a side view of the cargo scraping apparatus of FIGS. 1 to 3 and a section of a cargo hold, wherein the apparatus is depicted at various positions along the rails.

In FIG. 4 there is depicted a cargo scraping apparatus 10 located on two rails (only one of which, 50, is depicted), the rails being positioned above a cargo hold 40. FIG. 4 depicts the cargo scraping apparatus 10 in a sequence as it moves from one end of the cargo hold 40 (to the left of the Figure) to the other end of the cargo hold (to the right of the Figure).

In the same sequence the blades 14, 15 move closer to the base of the cargo hold 40 as the gantry 12 moves from left to right. In its initial position, the blades 14, 15 of the cargo scraping apparatus 10 are substantially in line with the length of the gantry 12; and in its final position the blades 14,15 are almost resting on the base of the cargo hold 40. FIG. 4 is intended to illustrate the reach of the blades 14, 15 of the scraping apparatus 10 into the cargo hold 40. FIG. 4 shows the location of the scraping apparatus 10 with respect to a cargo hold 40, where at one end of the cargo hold 40 there is a cargo collecting means comprising a hopper 71 as well as part of the lower section of a cargo conveying means 75 comprising bucket elevators (only the casing 81 of the elevators is depicted in FIG. 4).

Figure 5:
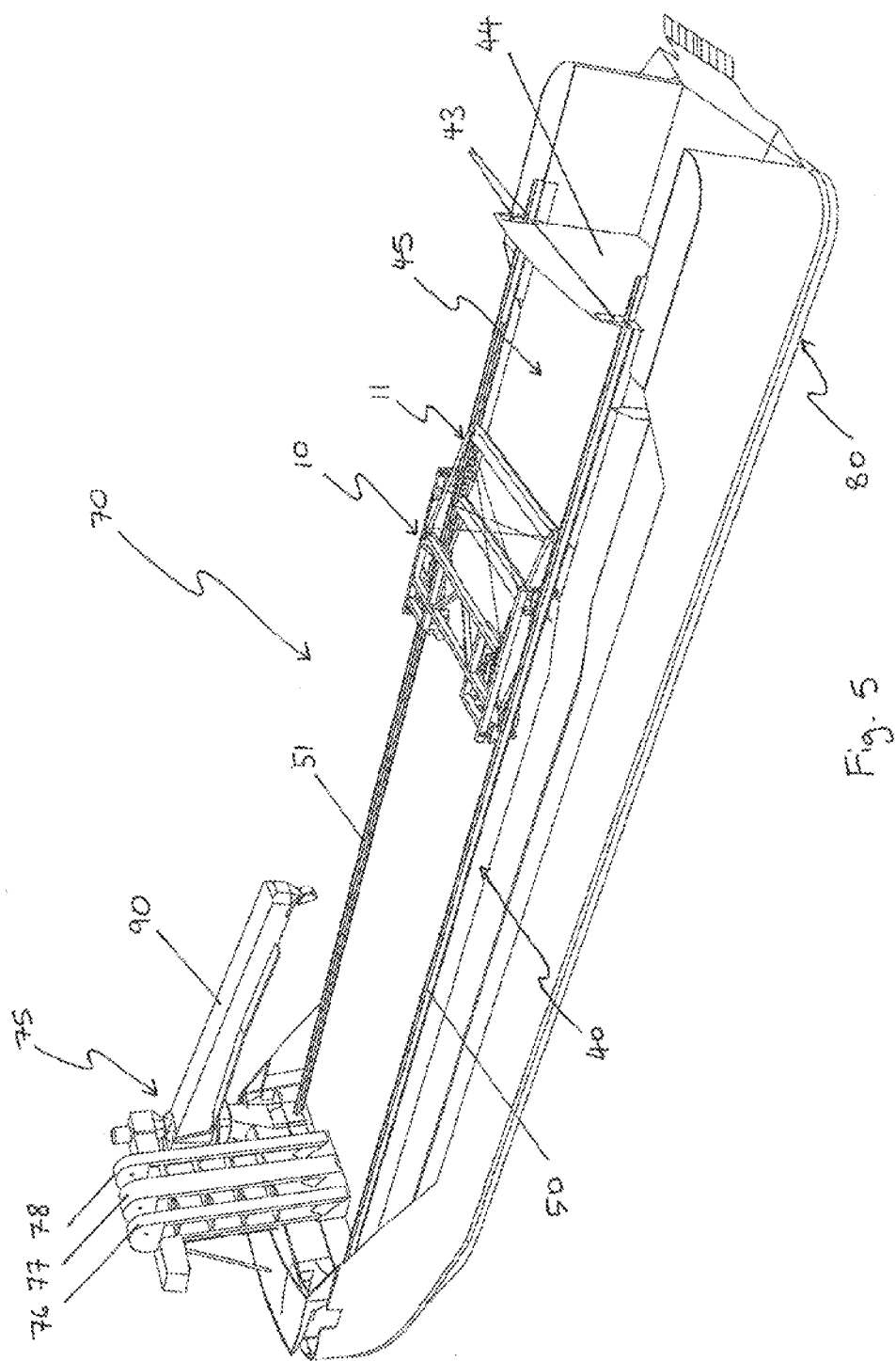
FIG. 5 is a left perspective view of a cargo unloading and loading system, including the cargo scraping apparatus of FIGS. 1 to 4 and a cargo conveying means, near the beginning of an unloading operation where the discharging boom is in a stowed position, the system being located on a shipping vessel.
Figure 6:
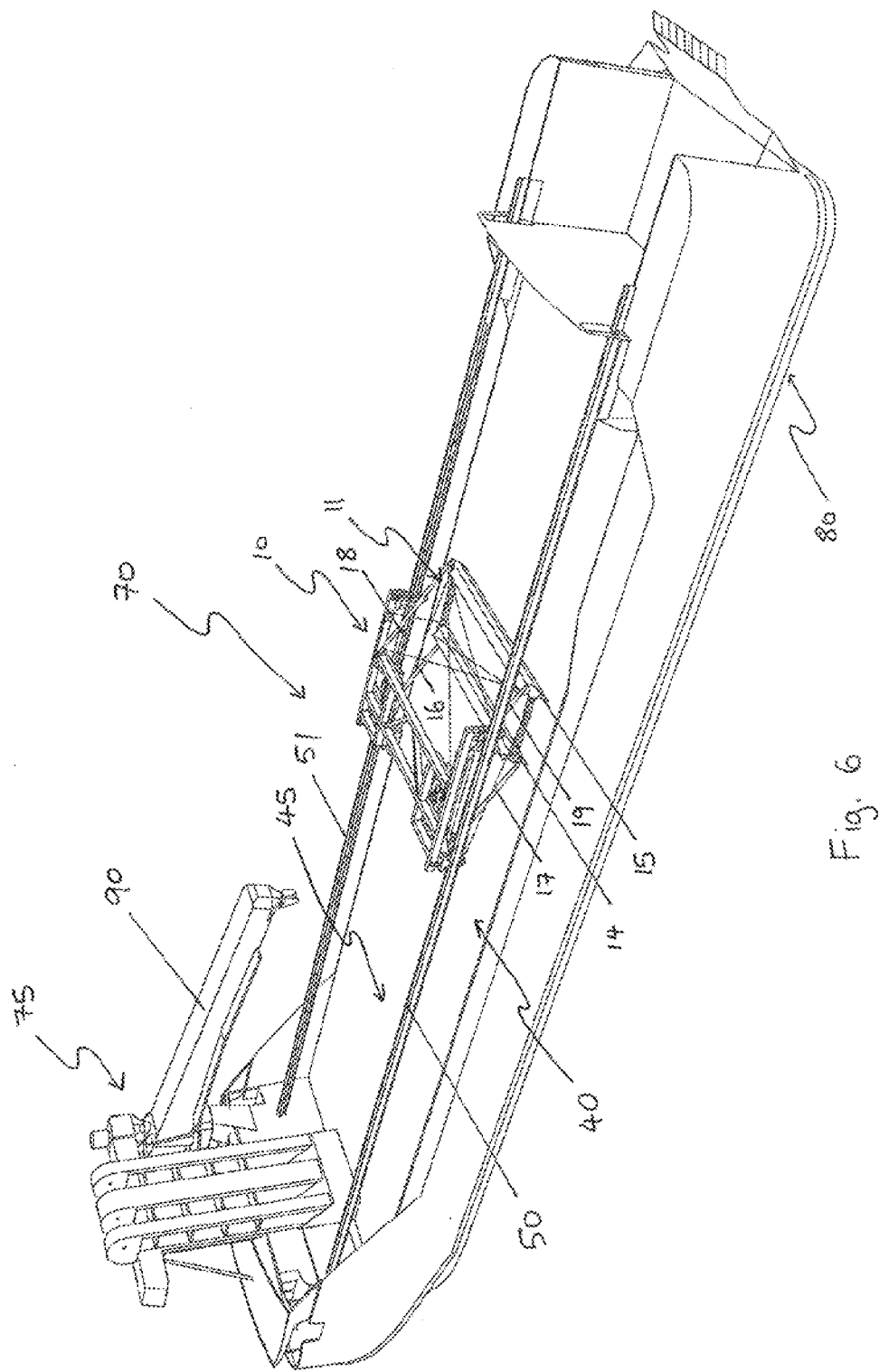
FIG. 6 is a left perspective view of the cargo unloading and loading system depicted in FIG. 5 part-way through an unloading operation, where the discharging boom is in a stowed position.

FIGS. 5 to 7 depict a system 70 for unloading cargo 45 from a transhipping vessel 80. The cargo scraping apparatus 10 of FIGS. 1 to 4 is one of a number of components of the system 70, which also includes a hopper 71, gates for managing cargo flow through the hopper 71 (not visible in FIGS. 5 to 7), cargo conveying means 75 comprising three bucket elevators 76-78, a cross conveyer 79 and a discharge boom 90. Only the outer case of the bucket elevators 76-78 themselves are visible in FIGS. 5 to 7.

FIG. 5 shows the system 70 at or near the beginning of an unloading operation where the scraping apparatus 10 is commencing its first cycle of the length of the cargo hold 40. The system 70 of FIG. 5 may equally be used during a loading operation, however this will be described with reference to FIGS. 11 and 12.

In FIG. 5, the rails 50, 51 are of sufficient length to permit the scraper 11 to reach both the bow (or front) and the stern (or rear) sections of the cargo hold 40. For example, in FIG. 5 there are apertures 43 in the rear wall 44 of the cargo hold 40 to permit part of the gantry 12 to overshoot the cargo hold 40, which in turn permits the scraper blades 14, 15 to reach the deepest regions in the rear section of the hold 40.

The cargo scraping apparatus 10 is adapted to cycle back and forth along the rails 50, 51, and in each cycle, the scraper 11 is able to collect cargo 45 in each of its two blades 14, 15 and, by movement of the gantry 12 along the rails 50, 51, the scraper 11 is able to push the cargo 45 collected therein towards the front section of the cargo hold 40. The cargo 45 pushed towards the front section of the hold falls by action of gravity into the hopper 71 (see FIG. 7), through the electrically controlled cargo regulating and distribution means (ie. gates, not depicted in FIGS. 5 to 7) and into the buckets of the three bucket elevators 76-78, then into the cross conveyer 79 and discharge boom 90 which completes the unloading of the cargo 45 from the transhipping vessel 80. The belts (not visible in the Figures) of the bucket elevators 76-78 the cross conveyer 79 are each controlled by electric motors (not shown in the Figures).

In FIG. 5, the pivotable rods 16-19 are in a raised position such that the scraper 11 is approximately in line with the gantry 12. At the beginning of the unloading operation, the gantry 12 pulls the scraper 11 across the top section of the cargo 45 which incrementally collects in the scraper blades 14, 15 as the scraping apparatus 10 moves from one end of the cargo hold 40 to the other. The front scraper blade 14 is slightly higher in the cargo hold 40 than the rear scraper blade 15, so that cargo 45 which passes under the first blade 14 is able to be collected by the second blade 15 during the cycle. During all but the very last stages of the unloading process, gravity acts on the cargo 45 located above the hopper 71 towards the front end of the transhipping vessel 80, and said cargo 45 flows through the hopper 71 towards the bucket elevators 76-78. Ideally, cargo 45 is being moved by the scraper 11 towards the front end of the cargo hold 40 at approximately the same rate that cargo 45 is being collected by the hopper 71 and removed from the vessel 80 by the conveying means 75.

FIG. 6 shows the system 70 part way through an unloading operation where part of the cargo 45 has been unloaded from the transhipping vessel 80. In FIG. 6, the pivotable rods 16-19 are partially lowered with respect to the gantry 12, and the scraper 11 is able to work on a lower section of the cargo 45 since some of the cargo has already been unloaded from the hold 40 as a result of scraper cycles performed earlier in the unloading operation.

In FIGS. 5 and 6, the unloading boom 90 of the cargo conveying means 75 is also shown in the stowed position, whereas in FIG. 7, the boom 90 is shown in the unloading position. The boom 90 includes a belt (not shown) having a speed which is electrically controllable, and the belt runs fast enough to efficiently discharge the material fed to it by the cross conveyer 90.

FIGS. 5 and 6 depict the cargo 45 lying flat in the cargo hold 40. It will be appreciated that this is an idealised depiction, and that the cargo 45 will in practice have various peaks, troughs or other topographical formations. In particular, the cargo 45 located towards the front end of the cargo hold 40 may, for a large part of the unloading operation at least, be uneven. This is because the scraper 11 is cyclically moving cargo 45 towards this front region of the hold 40 while at the same time cargo 45 is being collected by the hopper 71 underneath the cargo hold 40.

FIG. 7 shows the system 70 at the end of an unloading operation where all of the cargo has been unloaded from the transhipping vessel 80. In FIG. 6, the pivotable rods 16-19 are fully lowered with respect to the gantry 12 and the scraper blades 14, 15 are able to reach the bottom surface of the cargo hold 40 because all of the cargo 45 has already been unloaded by scraping cycles performed earlier in the unloading operation.

In FIG. 7, the upper part of the cargo collecting means 71 comprising a grating is depicted between the two scraper blades 14, 15.

FIG. 8 depicts the cargo scraping apparatus 10 from the interior of a cargo hold 40 towards the end of the cargo unloading operation. The teeth 52 of the rails 50, 51 are clearly visible in FIG. 8. It will also be appreciated that there are stabilising wheels 57 above and below the rails 50, 51 which act in combination with the toothed wheels 53, 54 of the gantry 12 to provide stability to the scraping apparatus 10 when it is moving along the rails 50, 51. The arrangement of the stabilising wheels 57 can best be seen in FIGS. 1 and 2. Also shown in FIG. 8 are residual piles of the cargo 45 remaining to be collected towards the front section of the cargo hold 40.

With further reference to FIG. 8, the cargo hold 40 incorporates sloping side walls 41 towards the base of the hold which aid the flow of cargo 45 towards the cargo collecting means.

Figure 13:
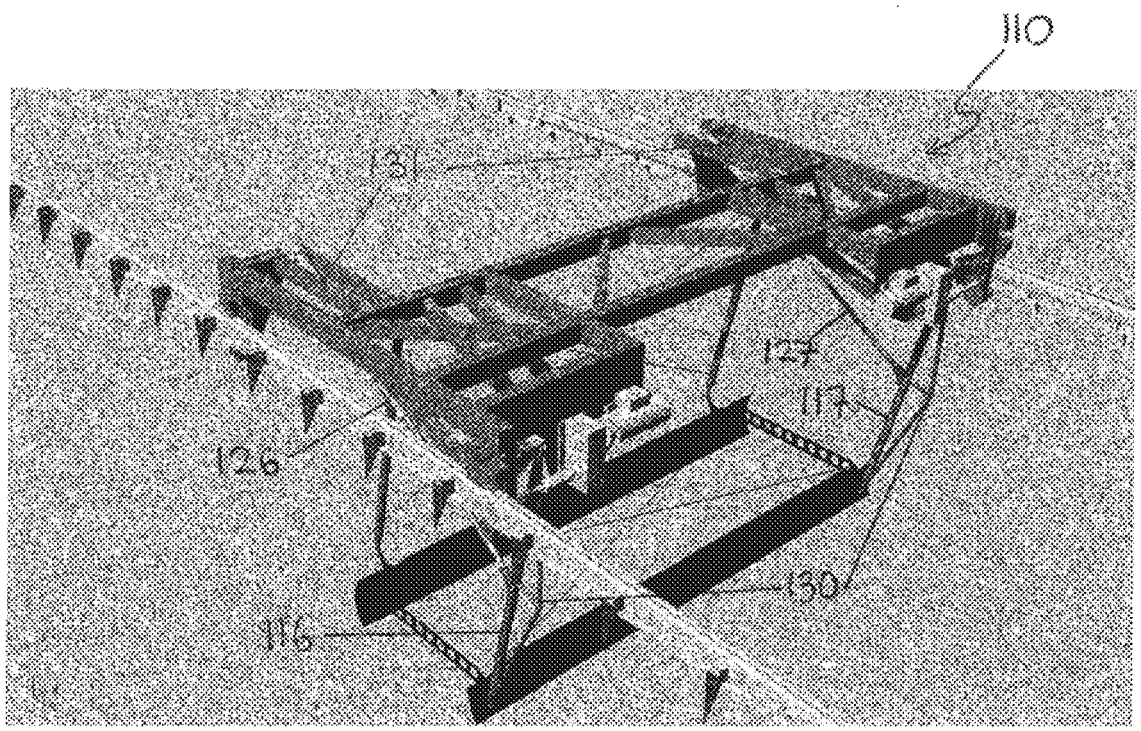
FIG. 13 is a perspective view of a second preferred embodiment of the cargo scraping apparatus located on two rails, where the blades of the scraping apparatus are lowered.
Figure 14:
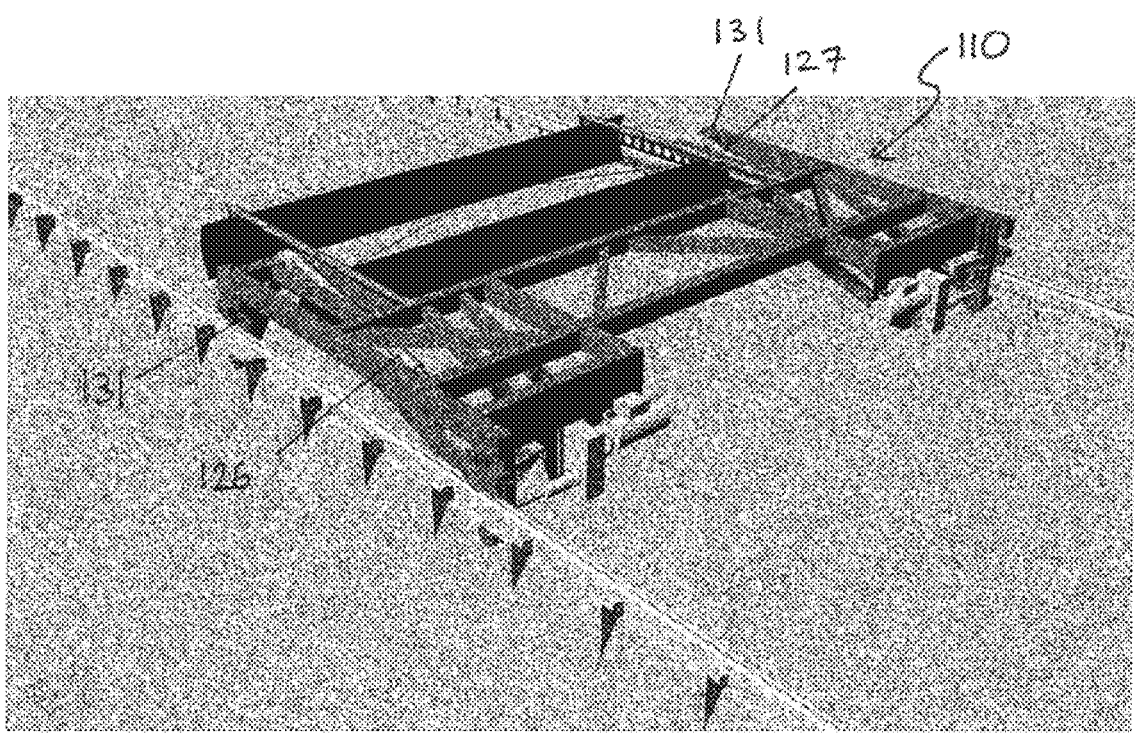
FIG. 14 is a perspective view of the cargo scraping apparatus on two rails depicted in FIG. 13, where the blades of the scraping apparatus are raised.

With reference to FIGS. 13 and 14, a second preferred embodiment of cargo scraping apparatus 110 of the invention is depicted. The second preferred embodiment shares the majority of the features described above with reference to the first preferred embodiment of the cargo scraping apparatus 10, however it principally differs in respect of its raising or lowering means which comprises a pair of hydraulic driven rams 126, 127. Other features present in FIGS. 13 and 14 include supporting structures 130, 131 located in the regions of the apparatus where the hydraulic driven rams are connected to the gantry 112 and where they are connected to the pivotable rods. The hydraulic driven rams 126, 127 (filled with ISO 21469 compliant lubricants) are pivotably connected to the gantry 112, and pivotably connected to their respective forward most rods 116, 117 approximately half way up each of the rods. The two forwardmost pivotable rods 116, 117, are strengthened by the supporting structures 130 made from the same material as other components comprising the scraping apparatus 110. The supporting structures 130, 131 assist the cargo scraping apparatus to withstand the pushing and pulling loads of the hydraulic rams as they are operated. The hydraulic driven rams 126, 127 are balanced in order to exert equal forces on their respective pivotable rods 116, 117, which assists to minimise the twisting or warping forces on the pivotable rods, scraper blades, gantry, and spacer beams.

Figure 9:
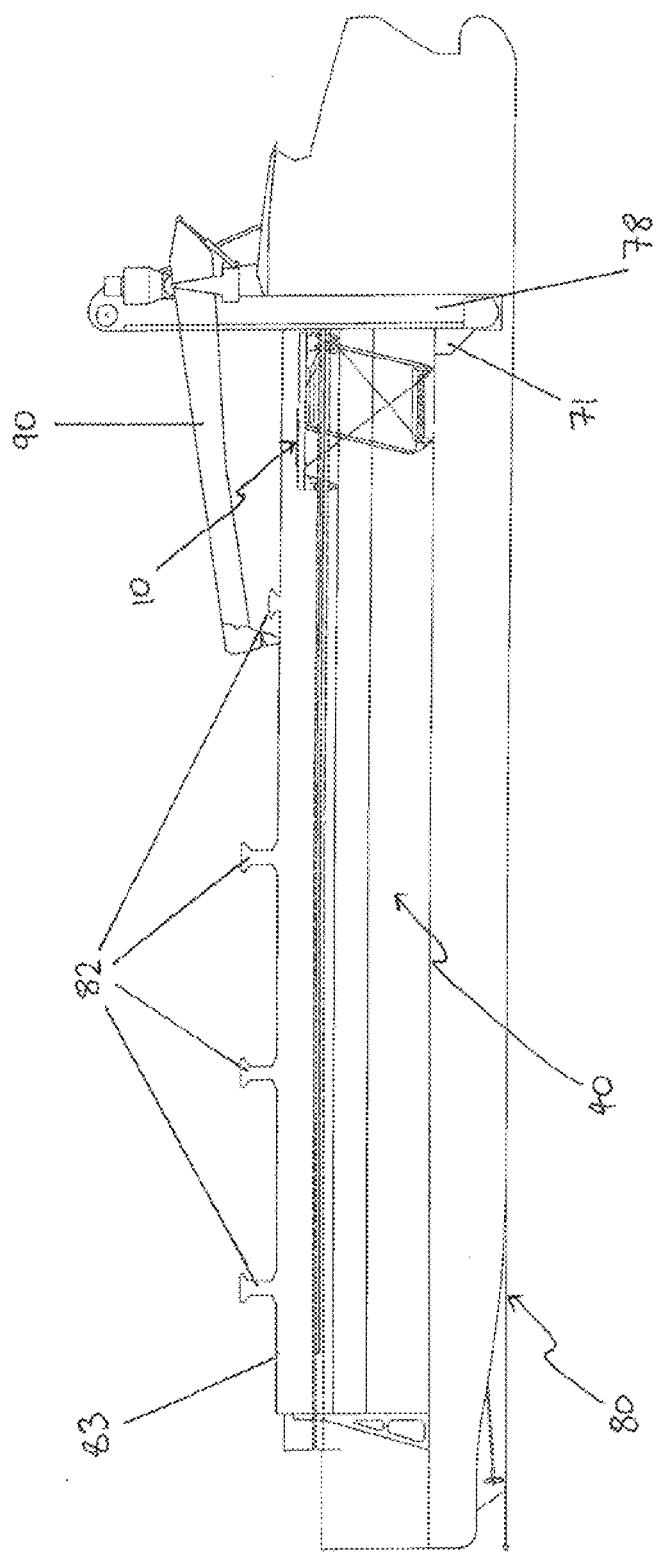
FIGS. 9 and 10 are side and top plan views, respectively, of part of the shipping vessel of FIGS. 5 to 7.
Figure 10:
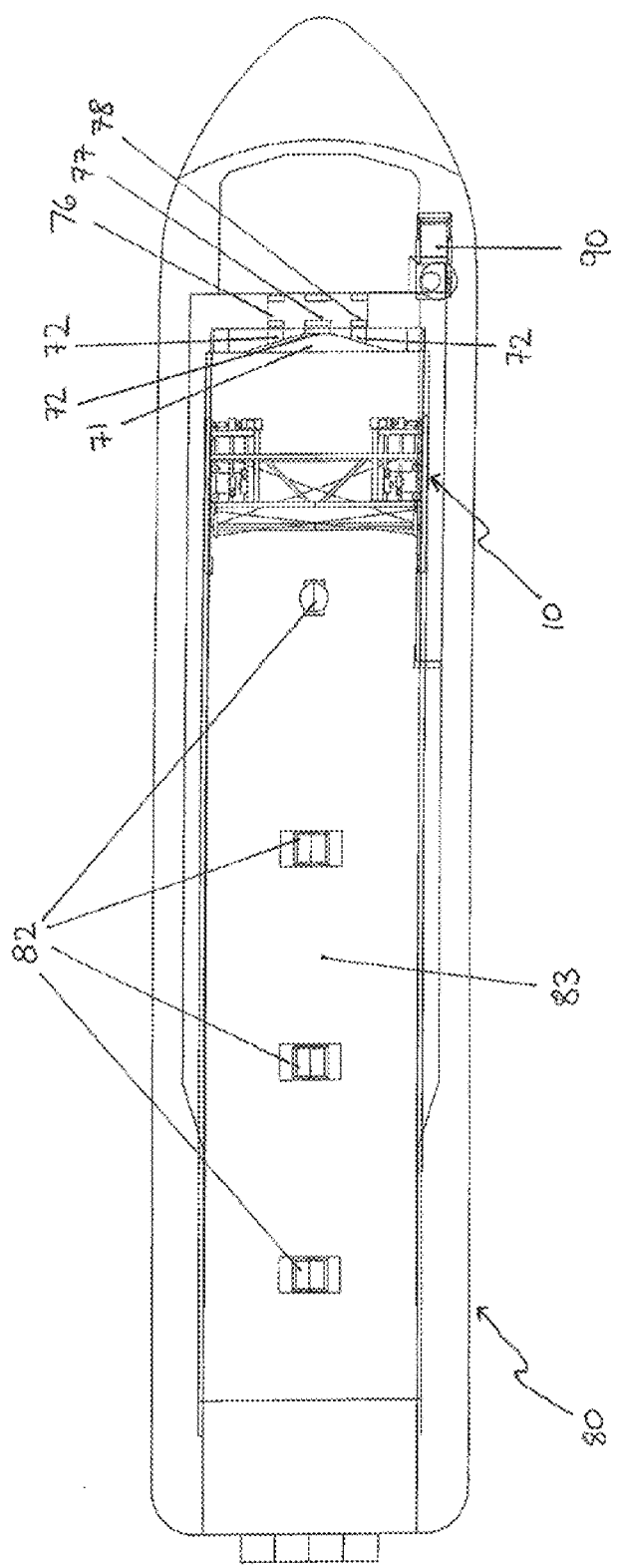

FIGS. 9 and 10 are side and top plan views of the transhipping vessel 80 of FIGS. 5 to 7. Here the three bucket elevators 76-78 are depicted in more detail. It will be appreciated by a person skilled in the art that each of the following components are adapted to handle fertilizer and conveying grain: the cargo collecting means comprising the hopper 71; the cargo distributing and regulating means comprising the gates (See FIG. 10) and the cargo conveying means comprising the bucket elevators 76-78, cross conveyer 79 and discharge boom 90. The dimensions of the hopper, gates, elevator buckets and speed of the conveyer belts may be modified tailored for different materials.

The transhipping vessel 80 includes four loading ports 82 which are situated above a canopy 83 for the cargo hold 40. The canopy 83 is able to protect cargo 45 in the hold 40 from the elements and weather. The unloading boom 90 is also shown in the stowed position in FIGS. 9 and 10. With reference to FIG. 10 in particular, the plan of the hopper 71 and the shafts of the bucket elevators 76-78 are visible towards the front end of the vessel 80. The hopper 71 is shaped to funnel the cargo 45 towards the gates 72 which may be variably opened depending on the desired rate of flow of the cargo 45 through the gates 72.

It will be appreciated that not all of the cargo 45 within the hold 40 will necessarily be able to scraped by the scraper blade 14,15 into the hopper 71, and the last scrape of an unloading operation may need to be followed by a brief residue scavenging process. This process may include the use of an industrial street sweeper or small bob-cat fitted with a customised blade/brush, so as to push the remnants of the cargo 45 into the cargo collecting means 71.

Figure 11:
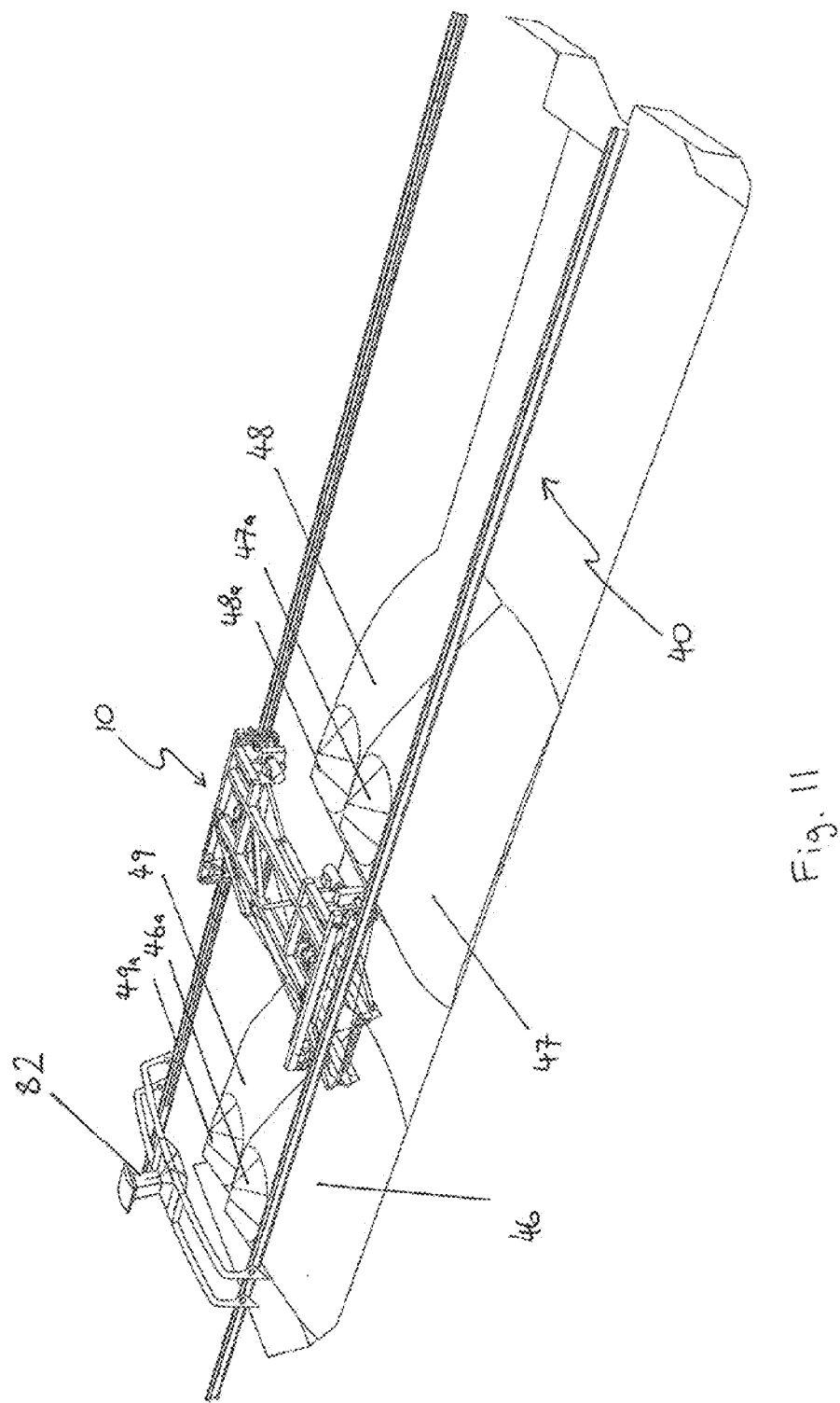
FIGS. 11 and 12 are perspective and side views, respectively, of part of the shipping vessel of FIGS. 5 to 7 during a loading operation.
Figure 12:
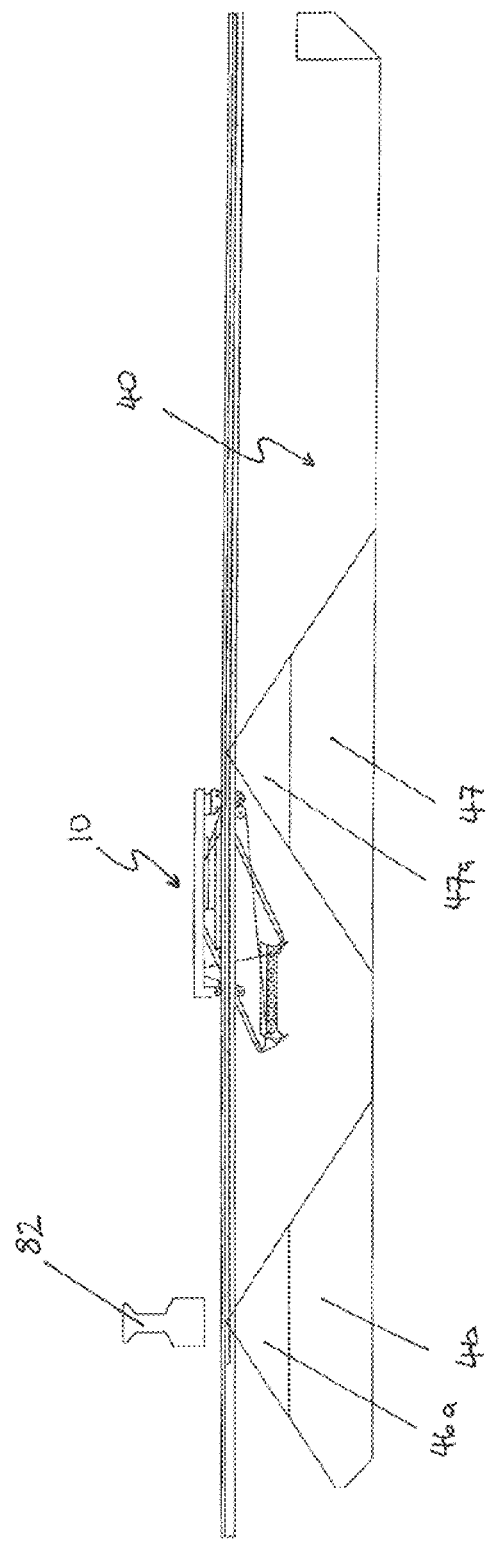

FIGS. 11 and 12 are perspective and side views, respectively, of the cargo scraping apparatus 10 of FIGS. 1 to 8 and a cargo hold 40 which has been partially loaded with cargo 45 during a loading operation to form four piles 45-49 underneath two bifurcated cargo loading ports 82 (only one of the loading ports is depicted). The scraping apparatus 10 is able to be used during a cargo loading operation, whereby the upper part of the cargo of each pile 46a, 47a, 48a, 49a is cut and pushed by the scraper 11 over the forward repose slope of the piles 45-49. The scraper blades can be set to any height in the hold and locked with brakes on the winches so that the blade cannot be dragged down into the cargo 45 nor ride up over it. The result is that cargo 45 located towards the upper part of the cargo piles 45-49 is more evenly spread toward a lower level in the cargo hold 40.

By spreading the cargo load 45, the trim and shear forces on the vessel's 10 structure may be lowered. Some of the initial load can be left unspread before the scraping apparatus 10 is set to spread 11 the cargo 45 during loading. The timing of the spreading operation, that is both at the initial stage and between successive spreading cycles, is determined by material handling consultants giving consideration to the characteristics of the cargo 45 and vessel 10.

For the purposes of clearly depicting the features of the invention, some components of the scrapping apparatus 10 or system 70 are not shown in each and every one of the Figures. For example, many of the Figures (eg. FIGS. 1 to 3) do not depict the cargo hold 40 and in FIG. 1, a lower section of the rail 50, depicted by a double line, is broken to the right side of the first pivotable rod 16 and to the right side of the third pivotable rod 18.

The unloading and loading systems 70 referred to above and referenced in the Figures will now be described in greater detail.

First, the unloading system 70 is described. The volume of the cargo hold 40 is approximately 4800 cubic meters, having a DWT capacity of 3600 tonnes of grain. During an unloading operation of grain cargo 45, the average mass of cargo scraped is 2900 tonnes. Not all of the cargo 45 needs to be scraped by the scraper blades 14, 15 because, when the cargo hold 40 is full, some cargo 45 is already located above the cargo collecting means 71 and by the effect of gravity it will be collected into the hoppers. Grain cargo has a stockpile height of approximately 5.5 meters when the cargo hold is fully loaded.

During the unloading operation, the cargo unloading system 70 discharges approximately 1800 tonnes of grain per hour. The gantry 12, and the scraper blades 14, 15 move at a velocity of 2.3 meters per second in both directions (ie. during scraping and return). The average stroke cut per cycle is 4 cm, as both the front and rear scraper blades 14, 15 have a scraper depth in the cargo 45 of approx 2 centimetres, and the front blade 14 is approximately 2 centimetres closer to the gantry 12 than the rear blade 15.

The average scraper cycle, or the time it takes for the gantry 12 to travel from one end of the hold to the other, and back again, is 50 seconds. The average number of cycles to scrape (substantially) all the cargo 45 out of the hold 40 is 145 cycles, and the cargo scraping apparatus 10 will, on average, perform about 73 cycles per hour. Approximately 20 tonnes of grain are moved per scrape.

Alternatively, the blades can move at a different rate (eg. 1.3 m/s) and the average stroke cut per cycle may be different (eg. 4 to 8 cm, each blade having a scraper depth of 2 to 4 cm), giving a different tonnage per scrape (eg. 40 t); the average cycle time can differ (eg. 90 s); and the average number of cycles per load may also differ (eg. 70; and 35 cycles per hour).

The loading system as depicted in FIGS. 11 and 12 operates during a loading operation in which the two bifurcated loading ports 82 receive approximately 800 tonnes per hour each of grain during a two hour loading operation. The minimum loading time is approximately 2% Y hours, the average grain load added during each scraping cycle is 40 tonnes, the scraper cycle speed, time, and capacity are the same as during the unloading operations. Some areas of the poured grain cargo 45 do not need levelling and the scraper 11 may be able to push some cargo into the forward corners of the hold 40.

The dimensions of components of the cargo scraping apparatus 10 and system 70, in approximate terms, are adapted to suit the dimensions of the hold and the vessel on which it is located: the scraper blades 14, 15 span the width of the hold 40; the gantry 12 is approximately as wide as the cargo hold 40; the length of the lifting and tension wire cables 21-24 is sufficient to permit the blades 14,15 to reach the base of the cargo hold 40; the rails 50, 51 are each slightly longer than the length of the cargo hold 40; and the width of the hopper 71 is slightly less than the width of the cargo hold 40 at its base.

It is intended that a person skilled in the art would be able to determine the dimensions of components by having reference to the Figures and associated description provided above.

The scraper blades 14, 15 have plastic edges and rubberised guide wheels (not shown in the Figures) on the sides and bottom of each of the scraper blades 14, 15 to protect the base of the cargo hold 40 yet ensure that the cutting edges of the blades 14a, 15a are able to travel very close to the cargo hold 40 base without touching it.

The blades 14,15, gantry 12, spacers 8,9 and rods 16-19 are constructed of stainless steel, however other materials may be used such as aluminium, or any other suitable material known to the person skilled in the art, or any combination of these materials.

The pivots between the blades 14, 15 and the rods 16-19, and between the rods 16-19 and gantry 12, are constructed of high grade marine materials including Aluminium, Duplex Stainless Steel 2205, AlNiBr (Aluminium Nickle Bronze). Other materials known to a person skilled in the art may also be used.

The cables 21-24, 29, 39 are constructed of Marine Grade Wire, having a SWL sufficient to handle the weights and forces associated with use of the apparatus. The electronic winches 25-28 may have a brake capacity of around 100 kN, or otherwise a capacity sufficient to permit safe control of the apparatus. The electronic motors for the toothed wheels 53-54 may be chosen from the selection of motors commonly known to the person skilled in the art.

The buckets of the bucket elevators 76-78 are made from injected moulded high grade industrial plastic, but not limited to other material choices.

Grain dust can be highly explosive and a number of safety measures are preferably included in the cargo scraping apparatus 10 and unloading or loading systems 70 of the subject invention. For example, all electrical equipment in the cargo hold 40 and galleries of the discharge boom 90 feeder, cross conveyor 79, and bucket elevators 76-78 are preferably dust ignition protection (DIP) rated. All belting for conveyors, feeders and elevators are also made of a fire resistant anti-static (FRAS) material. Temperature monitoring is preferably included for all high speed moving parts and fire wire is recommended to monitor the temperature of idlers on the conveyors and belt feeder.

Of course, particular speeds, volumes, measurements and other properties of the preferred embodiments of the invention described with reference to the Figures above are not intended to be prescriptive. Many factors influence the preferred properties of embodiments of the invention, including the type of carrier vehicle, whether it be water or land based, the type of cargo which is to be unloaded or loaded, the array of existing infrastructure which may be used in conjunction with the cargo unloading or loading system, the location of the conveying operations and various environmental consideration—all these factors play a role.

It will be understood by the person skilled in the art that there are various advantages provided by the parallelogram-like form of the cargo scraping apparatus. Take, for example, the apparatus including two (or more) blades, two or more of which are linked together by spacer beam(s) and pivotable rods which connect pivotably to both the gantry and to the blades. First, the large pressures and forces exerted on the scraper blades as they scrape cargo in the hold are able to be spread around the parallelogram frame, providing additional strength to the apparatus. Secondly, flexing of the components of the parallelogram frame is reduced. Thirdly, the pivotable connections between the components of the frame permit the raising or lowering means to act on one part of the frame and thereby raise or lower other parts of the frame. This means that the apparatus is simpler and more straightforward to operate than may otherwise be the case.

Further benefits of the apparatus may be observed during loading operations, the cargo scraping apparatus can work through pouring cargo streams as the machinery is able to be protected with coverings. In order to maximise the cargo hold space to carry the voluminous cargo, the scraper operates during the loading time to remove natural peaks created by the cargo natural angles of repose. The scraping apparatus will effectively spread the cargo so it is reasonably flat.

Other advantages include the cargo scraping apparatus and other parts of the systems of the invention are easy to access for engineers and equipment maintenance staff.

Furthermore, the invention the subject of this application is simple and thereby easier to manufacture than comparable apparatus and systems, it is also durable and particularly suited to handling cargo offshore. Where a parallelogram form of the apparatus is applied, this provides particular advantages in terms of structural strength and maintaining even scraping levels by preserving the substantially parallel alignment of the blades. Where the cargo scraping apparatus is located on a transhipping vessel it is particularly suitable for loading cargo into and unloading cargo from an OGV which can transport the cargo over long distances.

The lifting and tension wire cables provide advantages which have been described in detail above, and the pulleys of the preferred embodiment described in FIGS. 1-12 further assist in spreading of the weight of the scraper blades, spacers, rods, etc around the apparatus to assist the winches in their task or raising or lowering the blades.

The diagonal wire cables of each of the preferred embodiments provide further structural support.

Interpretation

Throughout the specification, the term "scrape" and its derivatives have been used with respect to the scraper blade to refer to the action of the scraper blade moving cargo in the cargo hold; as will be clear from the disclosure of the invention herein, the term "scrape" with reference to the scraper blade is intended to include the non-limiting actions of the blade sweeping or pushing cargo, and should be understood accordingly.

A number of components of the cargo scraping apparatus or systems the subject of this application are described as being electric, electrically controlled, or similar. It is intended that any or all references to the electric components, electrically controlled components, or similar, are to be understood as including electronically controlled components and, inter alia, the accompanying microcontroller cores, memory storage, inputs, outputs and communication links are likewise intended to be understood as present in such arrangements.

Reference to any background art or prior art in this specification is not an admission such background art or prior art constitutes common general knowledge in the relevant field or is otherwise admissible prior art in relation to the validity of the claims.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

The disclosure of any document referred to herein is incorporated by reference into this patent application as part of the present disclosure, but only for purposes of written description and enablement and should in no way be used to limit, define, or otherwise construe any term of the present application where the present application, without such incorporation by reference, would not have failed to provide an ascertainable meaning. Any incorporation by reference does not, in and of itself, constitute any endorsement or ratification of any statement, opinion or argument contained in any incorporated document.

In the present specification, terms such as "component", "apparatus", "means", "device" and "member" may refer to singular or plural items and are terms intended to refer to a set of properties, functions or characteristics performed by one or more items having one or more parts. It is envisaged that where a "component", "apparatus", "means", "device" or "member" or similar term is described as being a unitary object, then a functionally equivalent object having multiple components is considered to fall within the scope of the term, and similarly, where a "component", "apparatus", "assembly", "means", "device" or "member" is described as having multiple items, a functionally equivalent but unitary object is also considered to fall within the scope of the term, unless the contrary is expressly stated or the context requires otherwise.

The mere disclosure of a method step or product element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way as the scope of the claimed invention.

Where the preamble of a claim recites a purpose, benefit or possible use of the claimed invention, it does not limit the claimed invention to having only that purpose, benefit or possible use.

It will be appreciated by those skilled in the art that many modifications and variations may be made to the embodiments described herein without departing from the spirit or scope of the invention.

That which is claimed is:

1. A cargo scraping apparatus for a cargo carrier having a cargo hold, the cargo scraping apparatus including a gantry, at least one scraper blade dimensioned to substantially span the width of the cargo hold, means to connect the at least one scraper blade to the gantry and means to raise or lower the at least one scraper blade relative to the gantry, wherein moving the gantry relative to the cargo hold causes the at least one scraper blade to push or sweep cargo towards one or more regions of the cargo hold.

2. A cargo scraping apparatus for a cargo carrier having a cargo hold, the cargo scraping apparatus including a gantry, at least one scraper blade, means to connect the at least one scraper blade to the gantry and means to raise or lower the at least one scraper blade relative to the gantry, wherein moving the gantry relative to the cargo hold causes the at least one scraper blade to push or sweep cargo towards a cargo collecting means located below the cargo hold.

3. A cargo scraping apparatus in accordance with claim 2, wherein the at least one scraper blade is dimensioned to substantially span the width of the cargo hold.

4. A cargo scraping apparatus in accordance with claim 2, wherein the cargo scraping apparatus is adapted to push or sweep cargo within the cargo hold towards one or more regions of the cargo hold as the gantry moves towards the one or more regions of the cargo hold.

5. A cargo scraping apparatus in accordance with claim 2, wherein the cargo scraping apparatus is adapted to push or sweep layers of cargo towards one or more regions of the cargo hold.

6. A cargo scraping apparatus in accordance with claim 2, wherein the at least one scraper blade is able to reach cargo located in substantially all regions of the cargo hold.

7. A cargo scraping apparatus in accordance with claim 2, wherein the raising or lowering means is able to be locked such that during any one cycle of the scraping apparatus the at least one scraper blade is held at a certain depth, or within a certain range of depths, in the cargo hold.

8. A cargo scraping apparatus in accordance with claim 2, wherein a tension means is incorporated into the apparatus to make the at least one scraper blade resistant to pivoting upwards and riding over the cargo.

9. A cargo scraping apparatus in accordance with claim 8, wherein the tension means applies a tension force to the at least one scraper blade in the direction of travel of the gantry.

10. A cargo scraping apparatus in accordance with claim 2, wherein the at least one scraper blade has an angled surface which enables the cargo to be pushed towards one or more sides of the cargo hold.

11. A cargo scraping apparatus in accordance with claim 2, wherein, during any one cycle of the scraping apparatus, as the gantry moves relative to the cargo hold, additional cargo is scraped by the at least one scraper blade.

12. A cargo scraping apparatus in accordance with claim 2, wherein the apparatus has two or more scraper blades.

13. A cargo scraping apparatus in accordance with claim 12, wherein the two or more scraper blades are linked by one or more spacers.

14. A cargo scraping apparatus in accordance with claim 13, wherein the means to connect the two or more scraper blades to the gantry includes rods, the rods being pivotable with respect to the gantry, and pivotable with respect to the scraper blades or the one or more spacers.

15. A cargo scraping apparatus in accordance with claim 14, wherein the pivotable rods, the gantry, the one or more spacers and the scraper blades co-operably move together in the form of a parallelogram, whereby the gantry remains substantially parallel with the one or more spacers as the two or more blades are raised or lowered with respect to the gantry.

16. A cargo scraping apparatus in accordance with claim 2, wherein diagonal wires extend between the means to connect the at least one scraper blade to the gantry, or between two or more scraper blades, to assist in maintaining a parallel arrangement of the connecting means, or a parallel arrangement of the blades.

17. A cargo scraping apparatus in accordance with claim 12, wherein during operation of the apparatus the distance between the gantry and a first scraper blade is less than the distance between the gantry and a second scraper blade, thereby creating a gradient between the first scraper blade and the second scraper blade.

18. A cargo scraping apparatus in accordance with claim 17, wherein the gradient between the first and second scraper blades remains constant, or substantially constant, during operation of the cargo scraping apparatus.

19. A system for unloading cargo from a cargo hold, the system including a cargo scraping apparatus as claimed in claim 2 and cargo conveying means which is able to convey cargo away from the cargo hold, wherein the cargo scraping apparatus is adapted to push or sweep cargo towards the cargo conveying means and thereby facilitate the unloading of the cargo from the cargo hold.

20. A system for assisting in loading cargo into a cargo hold, wherein the system includes the cargo scraping apparatus claimed claim 2 and is able to push or sweep peaks of cargo piles in the cargo hold, thereby spreading the cargo more evenly so it lies flatter in the cargo hold.

21. A system for loading cargo into and unloading cargo from a cargo hold, the system comprising:
    a cargo scraping apparatus, the cargo scraping apparatus including
        a gantry;
        at least one scraper blade;
        means to connect the at least one scraper blade to the gantry; and
        means to raise or lower the at least one scraper blade relative to the gantry;
        wherein moving the gantry relative to the cargo hold causes the at least one scraper blade to push or sweep cargo towards a cargo collecting means located below the cargo hold; and
    cargo conveying means to convey cargo away from the cargo hold;
    wherein the cargo scraping apparatus is adapted to push or sweep cargo towards the cargo conveying means to facilitate the unloading of the cargo from the cargo hold;
    wherein the system is adapted to push or sweep peaks of cargo piles in the cargo hold to spread the cargo more evenly so it lies flatter in the cargo hold.

* * * * *